United States Patent
Le Geyt

(10) Patent No.: US 9,978,176 B2
(45) Date of Patent: May 22, 2018

(54) SIMPLIFYING SMALL MESH COMPONENTS WITH REDUNDANT BACKS

(71) Applicant: Electronic Arts Inc., Redwood City, CA (US)

(72) Inventor: Talan Le Geyt, Guildford (GB)

(73) Assignee: ELECTRONIC ARTS INC., Redwood City, CA (US)

(*) Notice: Subject to any disclaimer, the term of this patent is extended or adjusted under 35 U.S.C. 154(b) by 50 days.

(21) Appl. No.: 15/040,931

(22) Filed: Feb. 10, 2016

(65) Prior Publication Data

US 2016/0379406 A1 Dec. 29, 2016

Related U.S. Application Data

(60) Provisional application No. 62/185,183, filed on Jun. 26, 2015.

(51) Int. Cl.
| | |
|---|---|
| G06T 17/20 | (2006.01) |
| G06F 3/0482 | (2013.01) |
| G06F 3/0484 | (2013.01) |
| G06F 3/0481 | (2013.01) |

(52) U.S. Cl.
CPC .......... G06T 17/205 (2013.01); G06F 3/0482 (2013.01); G06F 3/04815 (2013.01); G06F 3/04845 (2013.01); G06F 3/04847 (2013.01)

(58) Field of Classification Search
CPC ............................. G06T 17/205; G06T 17/20
USPC ......................................................... 345/420
See application file for complete search history.

(56) References Cited

U.S. PATENT DOCUMENTS

| | | | |
|---|---|---|---|
| 5,894,308 A * | 4/1999 | Isaacs | G06T 17/20 345/420 |
| 8,698,809 B2 | 4/2014 | Hamedi et al. | |
| 8,860,723 B2 | 10/2014 | Johansson et al. | |
| 2012/0182298 A1* | 7/2012 | Sun | G06T 17/005 345/423 |

(Continued)

FOREIGN PATENT DOCUMENTS

| | | |
|---|---|---|
| EP | 2909813 A1 | 8/2015 |
| WO | 2009/096891 A1 | 8/2009 |

(Continued)

OTHER PUBLICATIONS

"Skeletal Mesh Simplification Tool". Skeletal Meshes. Unreal engine 3. Epic Games, Inc. Oct. 25, 2014.*

(Continued)

*Primary Examiner* — Barry Drennan
*Assistant Examiner* — Shivang Patel
(74) *Attorney, Agent, or Firm* — Lowenstein Sandler LLP

(57) ABSTRACT

A mesh simplification system receives three-dimensional (3D) polygonal mesh of a 3D object. The mesh simplification system identifies a component of the (3D) polygonal mesh, having a first surface area size being less than a second surface area size of the 3D polygonal mesh, wherein the component comprises a set of topologically interconnected surfaces that are modeled as a separate structure from the 3D polygonal mesh. The mesh simplification system then automatically generates a simplified version of the component by removing a back surface from the component, wherein the simplified version the component comprises fewer polygons than the component.

20 Claims, 20 Drawing Sheets

(56) References Cited

U.S. PATENT DOCUMENTS

| | | |
|---|---|---|
| 2014/0111510 A1 | 4/2014 | Lindahl et al. |
| 2014/0160121 A1 | 6/2014 | Johansson et al. |
| 2014/0198103 A1 | 7/2014 | Johansson et al. |

FOREIGN PATENT DOCUMENTS

| | | |
|---|---|---|
| WO | 2014/060585 A1 | 4/2014 |
| WO | 2014/086925 A1 | 6/2014 |
| WO | 2014/111221 A3 | 7/2014 |
| WO | 2016/005147 A1 | 1/2016 |

OTHER PUBLICATIONS

Skeletal Mesh Simplification Tool. Skeletal Meshes. Unreal engine 3. Epic Games, Inc. Oct. 25, 2014 [retrieved on Oct. 3, 2016] Retrieved from https://web.archive.org/web/20141025072812/http://udn.epicgames.com/Three/SkeletalMeshSimplicationTool.html, Section <<How It works>>, <<Summoning the Tool Window>>, <<Simplifying a Mesh>>, <<Simplication Settings>>, <<Generating an LOD, 10 pages.

International Search Report and Written Opinion of the International Searching Authority for PCT Patent Application No. PCT/US2016/039071, dated Oct. 13, 2016, 8 pages.

Garland et al., "Surface Simplification Using Quadric Error Metrics", SIGGRAPH '97, Proceedings of the 24th annual conference on Computer graphics and interactive techniques, published in 1997, pp. 209-216, Carnegie Mellon University, ACM Press/Addison-Wesley Publishing Co. New York, NY, USA.

Skeletal Mesh Simplification Tool. Skeletal Meshes. Unreal engine 3. Epic Games, Inc., Oct. 25, 2014 [retrieved on Oct. 3, 2016] Retrieved from https://web.archive.org/web/20141025072812/http://udn.epicgames.com/Three/SkeletalMeshSimplificationTool.html, Sections <<How It Works>>, <<Summoning the Tool Window>>, <<Simplifying a Mesh>>, <<Simplification Settings>>, <<Generating an LOD>>.

PCT Written Opinion of the International Searching Authority and PCT International Search Report for PCT Application PCT/US2016/039071, dated Oct. 13, 2016, 7 pages.

PCT Notification Concerning Transmittal of International Preliminary Report on Patentability for PCT Application No. PCT/US2016/039071, dated Jan. 4, 2018, 7 pages.

\* cited by examiner

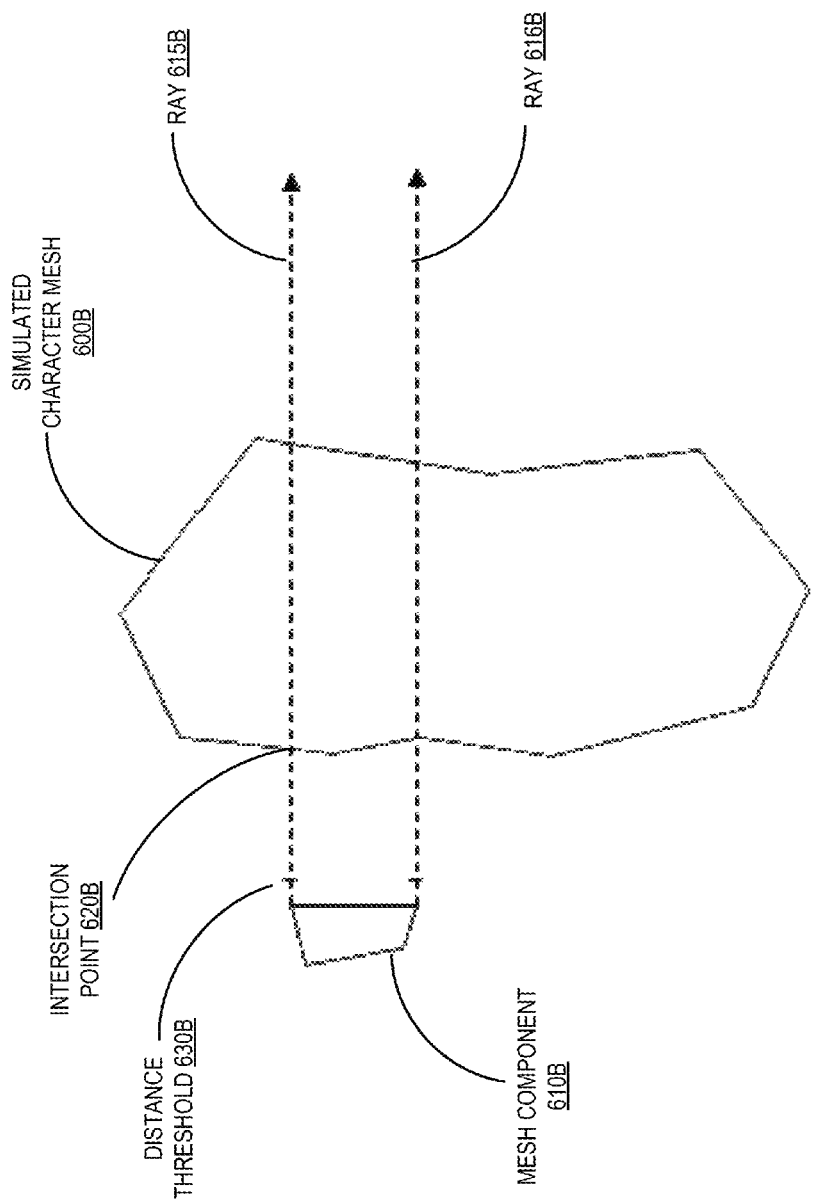

SIMPLIFYING SMALL MESH COMPONENTS WITH REDUNDANT BACKS

RELATED APPLICATIONS

This application claims the benefit of U.S. Provisional Patent application Ser. No. 62/185,183, filed Jun. 26, 2015, which is hereby incorporated by reference.

TECHNICAL FIELD

The present disclosure is generally related to mesh simplification and, more specifically, to generating computationally simpler versions of 3D models for viewing at greater distances.

BACKGROUND

A polygonal mesh may be represented by a collection of vertices, edges, and faces that define the shape and/or boundaries of a three-dimensional object. An edge may be represented by a line connecting two vertices. A vertex may be represented by a point having a certain spatial position. Mesh faces may be represented by various polygonal shapes such as triangles, quads (quadrangles), and/or other regular or irregular polygons. In various illustrative examples, a triangular face may be formed with a closed set of three edges, a quadrilateral face may be formed with a closed set of four edges, etc.

In the context of creating computer-generated imagery, mesh simplification may be employed to create of simplified versions of mesh models. Mesh simplification, also referred to as Level of Detail (LOD) generation, may be employed for generating a simplified version of an original model of an object that may be represented by an artist-authored model of a computer game character. Simplified versions of the original model may be employed to simulate views at the modeled object from various distances.

BRIEF DESCRIPTION OF THE DRAWINGS

The present disclosure is illustrated by way of example, and not by way of limitation, and can be more fully understood with reference to the following detailed description when considered in connection with the figures in which:

FIG. 6B illustrates a back surface of a mesh component that is not identified as a back face in relation to a simulated character mesh, in accordance with one or more embodiments of the present disclosure.

DETAILED DESCRIPTION

Figure 1A:
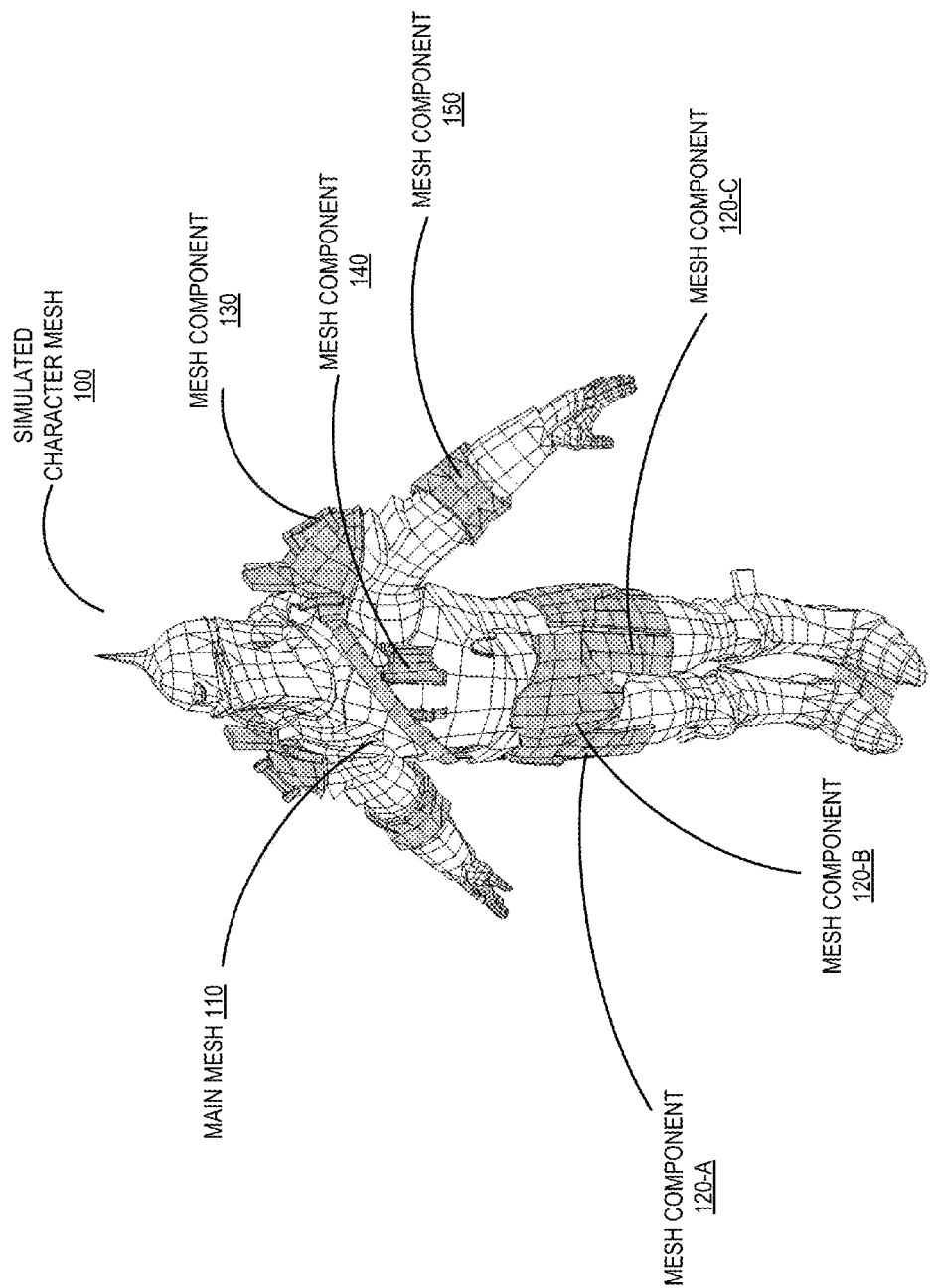
FIG. 1A illustrates a simulated character mesh that represents a 3D polygonal mesh of a knight character for a graphical simulation, in accordance with one or more embodiments of the present disclosure.

Described herein are methods and systems for simplifying small mesh components with redundant back faces. Meshes are often composed of multiple "components." In certain implementations, the term "component" can refer to an island of topologically interconnected faces. Small surface features of 3D models are often modelled as separate components. For example, a shoulder pad or badge on a character, although it appears graphically to overlap or touch the main body, might be a topologically separate component.

In situations where small features of a mesh have been modelled as separate components, and positioned on the surface of the main mesh, there may be some faces of the small component which form the "back" of the component (e.g., where the small component "butts up" against the main mesh). These faces may be very close to, exactly touching, or slightly overlapping the faces of the main mesh where the component is positioned on its surface. This can often be the case when an artist has modelled a feature like a badge or armor plate on a character, or a picture on a wall of a building, as a complete, closed component, rather than leaving out the back. In this situation, the back could be redundant if the component is to be positioned on the surface of a larger mesh, since the larger mesh would obscure the back, or at least minimize the number of angles from which the back could be seen by a viewer.

Embodiments of the present disclosure can provide the ability to simplify mesh components with redundant backs by identifying a small component on the surface of a larger mesh, identifying the mesh's back surfaces (or "back faces,") and subsequently automatically removing the back faces from the mesh. These back faces may contribute little to the appearance of the mesh, especially when viewed from far away. Removing the back faces can reduce the polygon count of a mesh without significantly changing its appearance. Thus, the simplified mesh can reduce the resources required for both rendering and storage. Additionally, in automatically generating the simplified mesh, the redundant backs may be identified and removed without requiring extensive work on the part of an artist and can thus be completed more efficiently, and without relying on the subjectivity of the artist.

In an illustrative example, a mesh simplification system receives a three-dimensional (3D) polygonal mesh of a 3D object. The 3D polygonal mesh may be a representation of a 3D object that is made up of topologically interconnected polyhedral planar facets of a planar surface approximation of the 3D object. The mesh can be received from an authoring tool used by an artist for creating the 3D object. For example, an artist may use an authoring tool to create a mesh for the 3D representation of a simulated character for a video game, 3D animation, or the like. The mesh may then be saved (e.g., to a local storage device) and subsequently sent to the mesh simplification system. In some implementations, the mesh simplification system may be a component of the authoring tool used by the artist to create the mesh. Alternatively, the mesh simplification system may be a separate component that runs independently of the authoring tool.

As noted above, the polygonal mesh may be represented by a collection of vertices, edges, and faces that define the shape and/or boundaries of the 3D object. An edge may be represented by a line connecting two vertices. A vertex may be represented by a point having a certain spatial position. A mesh face may be a polyhedral, planar surface approximation of a portion of a 3D object (e.g., a planar facet within a mesh). Mesh faces may be represented by various polygonal shapes such as triangles, quads (quadrangles), and/or other regular or irregular polygons. In various illustrative examples, a triangular face may be formed with a closed set of three edges, a quadrilateral face may be formed with a closed set of four edges, etc.

In some implementations, the 3D polygonal mesh can be made up of multiple components, where a component can be an additional set of topologically interconnected surfaces that are modeled as a separate structure from other portions of the mesh. A component may have a front side and a back side, each of which have a high level of detail. The front side of the component may be positioned away from the main part of the 3D polygonal mesh and the back side may be positioned in close proximity to the main part of the 3D polygonal mesh.

In an illustrative example, a user of the system (e.g., artist) may create a 3D polygonal mesh for a simulated character of a knight for a video game. The knight character may be represented in the 3D polygonal mesh to include the knight's body (e.g., the "main mesh"), as well as individual portions of the knight's armor represented as separate structures such as a helmet, chest plate, gauntlets, shield, etc. The artist may create the portions of the knight's armor as components of the main mesh for the simulated character that are topologically isolated from the main portion of the mesh as well as topologically isolated from each other. Thus, a component may be constructed separately from the main mesh and later positioned so that it may appear graphically to touch, overlap, or appear very close to the main mesh (or to other components) of the 3D object. Other examples of components of a mesh can include, but are not limited to, a badge displayed on the uniform of a character, elements of clothing, components of armor plating on a military style character, a picture frame displayed on a wall of a room, etc.

The mesh simplification system may then identify components of the mesh that are targets for simplification by removal of redundant back faces (e.g., back surfaces). The system may select eligible components of the mesh by first determining whether any of the components associated with the main mesh are small in relation to the overall surface area of the mesh. To do so, the mesh simplification system may determine whether the size of the component is less than or equal to a threshold size, where the threshold size may be a percentage of at least a portion of the surface area of the 3D polygonal mesh. In some implementations, the portion of the surface area of the 3D polygonal mesh used to calculate the threshold may be the surface area of a single component. Alternatively, the entire surface area of the 3D polygonal mesh (e.g., the entire portion of the 3D polygonal mesh) may be used to calculate the threshold.

In one embodiment, the mesh simplification system may determine the threshold size using the entire surface area of the 3D polygonal mesh. First, the system determines the total size of the surface area of the 3D polygonal mesh. The surface area may be measured in square inches ($in^2$), square centimeters ($cm^2$), square millimeters ($mm^2$), or any other unit of measure that represents a measurement of area. In some implementations, the surface area of the 3D polygonal mesh may be computed by first computing the value of the surface area of each individual face in the mesh and then adding the computed values together. The surface area of a face may be computed by first subdividing the face into one or more triangles (if the face was not already triangular) by adding additional edges between non-connected vertices. The area of each triangular face could then be calculated by computing half of the magnitude of a vector cross-product of two vectors that represent any two edges of the triangle. The system may then determine the threshold size as a percentage of the total size of the 3D polygonal mesh. For example, the threshold size may be set to a value that is five percent of the surface area size of the 3D polygonal mesh (e.g., the size of the main mesh and all associated components). The system may then compare the size of the component to the threshold size. If the size of the component is less than or equal to the threshold size, then the component may be deemed a small component, and thus be eligible for simplification.

In one embodiment, the mesh simplification system may determine the threshold size using the surface area of another component from the mesh. For example if the component is near in proximity to a second component, the system may use the size of the second component to determine whether the first component is small enough to be eligible for simplification. Using the knight example above, this might occur if an armor chest plate component was positioned close to another smaller component. First, the system determines the total size of the surface area of the second component (e.g., the larger component of the two). The surface area may be measured in square inches ($in^2$), square centimeters ($cm^2$), square millimeters ($mm^2$), or any other unit of measure that represents a measurement of area. In some implementations, the surface area of the 3D polygonal mesh may be computed as noted above. The system may then determine the threshold size as a percentage of the size of second component. For example, the threshold size may be set to a value that is five percent of the surface area size of the second component. The system may then compare the size of the component to the threshold size. If the size of the component is less than or equal to the threshold size, then the component may be deemed a small component, and thus be eligible for simplification.

While the above embodiments describe a threshold size percentage of five percent, it should be noted that the threshold size percentage may be set to values higher or lower than five percent. The threshold size percentage may be adjusted depending on the expected detail for the resulting simplified mesh (e.g., how far away the simplified mesh will be viewed from). In some implementations, the threshold size percentage may be modified by a user via a graphical user interface (GUI). For example, a user may enter the percentage directly into an input filed, select from a dropdown list of options, adjust the values using a slider bar GUI element, or in any other manner. Alternatively, the system may select the threshold size automatically based on a distance from which the simplified mesh will be viewed.

In some implementations, once a component has been identified as a small component eligible for simplification, the system may then also determine whether the component is a "closed" component. A component may be a closed component when that component is made up of a 3D geometry that forms a complete surface that encloses a defined volume without any gaps. A component constructed in this fashion can be a strong indicator that it may be an object modeled with two sides. Thus, a closed component that is positioned close to, touching, or overlapping the main mesh may have a back surface (e.g., one or more back faces) that may be obscured when viewing the entire mesh together.

Once a component has been targeted as eligible for simplification, the mesh simplification system may then determine if there are any back surfaces (e.g., any back faces) of the component that can be removed. To do so, the mesh simplification system may determine if any of the back surfaces of the component are close to, touching, or overlapping any surface of another component or any surface of the main mesh. In some implementations the mesh simplification system may determine that the distance between a back surface of the component and at least one surface of the main mesh (or another component) is equal to or less than a threshold distance. The threshold distance may be a percentage of the linear size of the 3D polygonal mesh. In some implementations, the linear size of the 3D polygonal mesh used to calculate the threshold distance may be the maximum distance between any two vertices of the mesh. Alternatively, the largest dimension of the bounding box of the 3D polygonal mesh (the bounding box being the smallest box that completely contains the 3D polygonal mesh) may be used to calculate the threshold distance. The linear size may be measured in inches, fractions of inches, centimeters, millimeters, or any other unit of measure.

In one embodiment, the threshold distance may be set to a value that is five percent of the linear size of the 3D polygonal mesh, or alternatively, of the additional component. In other embodiments, the threshold distance percentage may be set to values higher or lower than five percent. The threshold distance percentage may be adjusted depending on the expected detail for the resulting simplified mesh (e.g., how far away the simplified mesh will be viewed from). In some implementations, the threshold distance percentage may be modified by a user via a graphical user interface (GUI). For example, a user may enter the percentage directly into an input filed, select from a dropdown list of options, adjust the values using a slider bar GUI element, or in any other manner. Alternatively, the system may select the threshold distance automatically based on a distance from which the simplified mesh will be viewed.

The mesh simplification system may first identify a back surface of the component using ray casting. Ray casting is a 3D rendering technique where a geometric ray is cast out from a point on a surface of a mesh in the direction of the eye of the observer to determine the closest object blocking the path of that ray. Using ray casting, the mesh simplification system may determine the distance between the component and the main mesh (or other component of the mesh). In some implementations, rays may be cast from each vertex of a surface (e.g., each vertex of a face) of the component. For example, in the case of a polygonal face with four vertices, four rays may be cast, one ray from each vertex. Alternatively, a single ray may be cast from a particular point on the surface (e.g., from the center of the surface).

To identify a back surface of the component, the mesh simplification system may first select one of the surfaces of the component mesh (e.g., one of the faces). The system may then cast a ray (a single ray, a ray from each vertex, etc.) from the selected surface in a direction of a surface normal vector of the first surface. The surface normal vector is a vector that is perpendicular to a plane that is tangent to the geometry of the identified surface. In alternative embodiments, rays may be cast in multiple directions from the tangent plane rather than just in the direction of the surface normal vector. The system may then determine where the rays intersect the rest of the 3D polygonal mesh (either the main mesh or another component part of the mesh).

The mesh simplification system may identify the first intersection point of each ray with a surface of the main mesh (or additional component). In some implementations, the first intersection point may be a location on the main mesh (or additional component) where the ray intersects the geometry of the main mesh (or additional component) that is closest in distance to the start of the ray. In other words, the first intersection point represents the first surface (other than that of the component eligible for simplification) that the ray intersects. Depending on how close the component is to the main part of the mesh (or additional component), the ray may intersect either a front surface (e.g., the surface facing the component) or a back surface (the surface of the main mesh that faces away from the component). The ray may intersect a front surface of the main mesh if the component is positioned close to, or slightly touching the front of the main mesh. The ray may intersect a back surface of the main mesh if the component is positioned such that the back face of the component slightly overlaps the front face of the main mesh. Examples of various ray casting intersection points are described below in further detail with respect to FIGS. 6A-6D.

In one embodiment, the mesh simplification system may determine that the first intersection point of the ray is located on a front surface of the main mesh (or additional component). The system may determine the distance between the surface of the component (e.g., from the origin of the ray) and the intersection point on the main mesh (or additional component). The system may then use the threshold distance described above to determine if the surface of the component is close enough to qualify a back surface that may be removed. Responsive to determining that the distance between the surface and the intersection point is less than or equal to the threshold distance, the mesh simplification system may identify the surface as a back surface (e.g., a back face).

In another embodiment, the mesh simplification system may determine that the first intersection point of the ray is located on a back surface of the main mesh (or additional component). As noted above, this may occur when the component is positioned such that the back surface of the component overlaps the front surface of the main mesh (or additional component). In this situation, the system may identify the surface of the component as a back surface regardless of the distance between the surface and the intersection point of the ray with the main mesh.

Once a surface of the component is identified as a back surface (and is thus eligible for removal), the mesh simplification system may then automatically generate (e.g., without user interaction) a simplified component for the 3D polygonal mesh by removing the back surface (e.g., removing the back face) from the mesh of the component. In some implementations, the 3D polygonal mesh is stored as a collection of faces (e.g., in a database, a list, or the like) that are each associated with an index (or handle) to provide the system with the ability to modify the attributes of the associated face. The mesh simplification system may remove the surface (e.g., the face) by invoking the appropriate handle associated with the face to delete the face from the mesh.

Thus the simplified component retains the structural elements of the front surfaces of the original component without the back surfaces that would be obscured by the main part of the mesh (or an additional component) due to the component being positioned close to the main mesh (or additional component). The resulting simplified component may thus include a front side with a mesh having a high level of detail and positioned away from the main part of the 3D polygonal mesh. The simplified component may also have a back side having a low level of detail relative to the front side, and positioned in close proximity to the surface of the main part of the 3D polygonal mesh, where facets of the component have been removed.

In some implementations, rather than remove the surface immediately, the mesh simplification system may mark the identified back surface for removal by another component of the system. For example, the database element associated with the back surface may be modified to include an additional attributed to indicate whether the back surface has been selected for removal. The mesh simplification system may then pass the updated mesh (with the back faces identified and marked for removal) to another component of an authoring tool used by the artist to complete the simplification process.

In some implementations, the mesh simplification system may include additional safeguards to insure that removal of back surfaces does not result in a poorly-formed mesh. In an illustrative example, the mesh simplification system may determine whether removing the back surface from the component may introduce non-manifold topology to a resulting simplified component. One example of non-manifold topology is when a vertex of a component is incident to two or more locally disconnected faces of the component (i.e. the vertex is incident to two or more groups of faces, where all the faces in each group include the vertex, and are connected by shared edges, but the different groups do not share any edges). Such a vertex can be defined as being a non-manifold vertex. Prior to removing a back surface from the component, the mesh simplification system can model the resulting structure with the surface removed to determine whether the removal could result in a non-manifold topology. Responsive to determining that removing the surface would result in a non-manifold topology, the mesh simplification system could retain the back surface as part of the simplified component rather than remove it. In some implementations, the mesh simplification system can analyze possible combinations of back surfaces that are eligible for removal, and select the largest set of surfaces that can be removed without introducing non-manifold topology.

Embodiments of the present disclosure provide the ability to generate simplified components of a 3D polygonal mesh by removing redundant back surfaces. This can provide a more efficient mesh structure by removing surfaces from the mesh that will not likely be seen, thus reducing resources required by the rendering process. Additionally, this can reduce the memory and storage required to support a rendered object since surfaces that will most likely be obscured by larger components or the main part of the mesh for the object will not need to be saved. This can especially be true for lower detail versions of a 3D object that may be used by a graphical simulation for displaying a 3D object at a distance from the viewer.

Figure 1B:
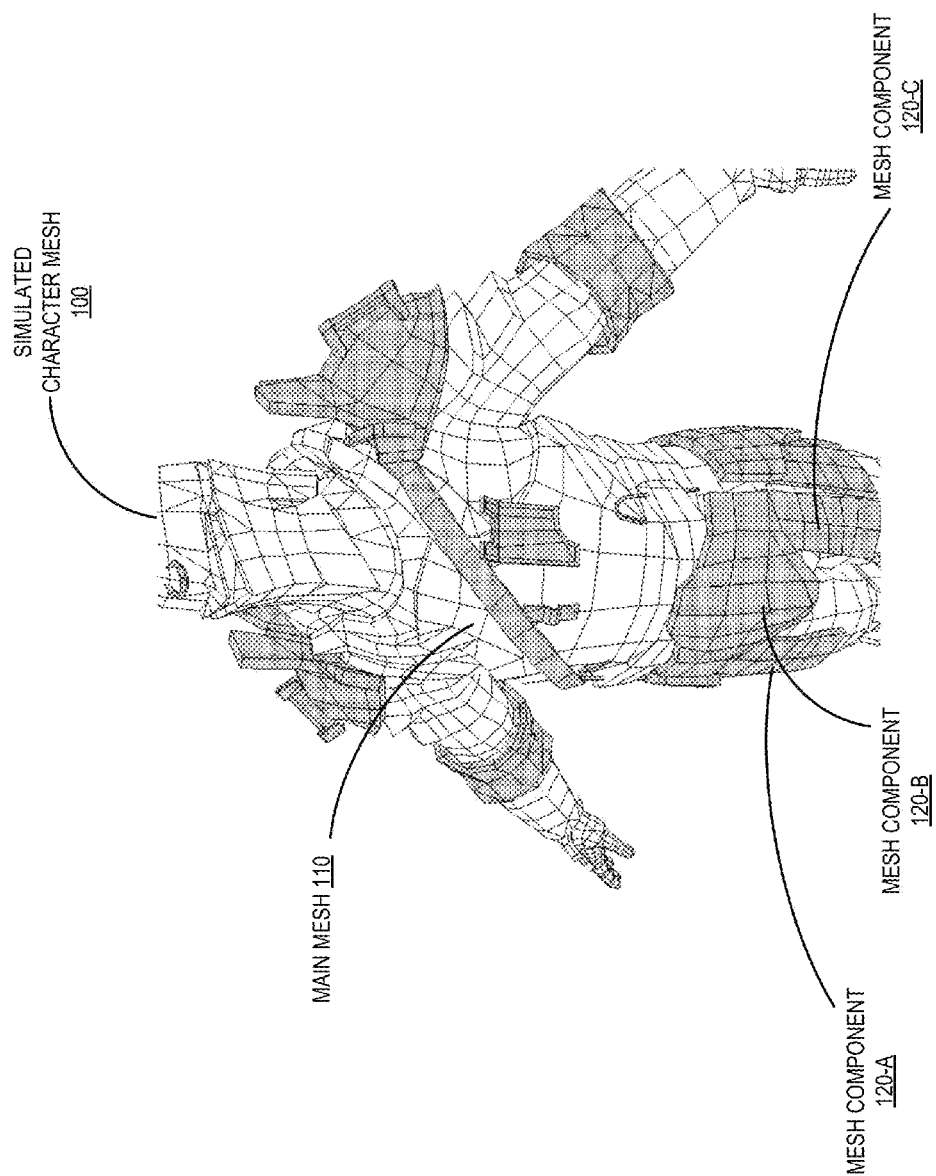
FIG. 1B illustrates a zoomed in view of a simulated character mesh, in accordance with one or more embodiments of the present disclosure.

FIGS. 1A-1B illustrate examples of different views of a 3D polygonal mesh for a simulated character that includes multiple components. FIG. 1A illustrates simulated character mesh 100 that represents a 3D polygonal mesh of a knight character for a graphical simulation. Simulated character mesh 100 includes a main mesh 110, mesh components 120A-C, and mesh components 130-150. As shown in FIG. 1A, main mesh 110 represents the main body of the knight character, while mesh components 120A-C and mesh components 130-150 represent various components that have been modeled separately from main mesh 110, and that are positioned on simulated character mesh 100 as overlapping the main mesh 110.

Mesh components 120A-C illustrate portions of armor plating that are positioned over the abdomen and upper legs of main mesh 110. As shown, the front surfaces (front faces) of mesh components 120A-C are positioned facing outward from main mesh 110, while the back surfaces (back faces) of mesh components 120A-C are positioned facing inward toward main mesh 110. In an illustrative example, mesh components 120A-C may be identified by a mesh simplification system as described above as potential targets for simplification by removal of redundant back faces. As illustrated in FIG. 1A, mesh components 120A-C may each be identified as small in comparison to main mesh 110 since each may encompass a surface area that is smaller than that of main mesh 110. Additionally, FIG. 1A depicts mesh components 120A-C as being very close (if not touching) the surface of main mesh 110. Thus, the back surfaces (back faces) of mesh components 120A-C should be obscured from view even if the simulated character mesh 100 is rotated to show its side or back. Thus, the back surfaces of 120A-C may be deemed redundant by the mesh simplification system described above, and thus become targets for removal.

Mesh components 130-150 depict other examples of components associated with main mesh 110 as part of simulated character mesh 100. Mesh component 130 depicts an example of a shoulder pad portion of the knight's armor plating. Mesh component 140 depicts an example of a badge portion (or a type of decorative overlay) of the knight's armor plating. Mesh component 150 depicts an example of an elbow gauntlet portion of the knight's armor plating. Each of mesh components 130-150 could also be deemed eligible for simplification as described above based on their size and position in relation to main mesh 110.

FIG. 1B illustrates a zoomed in view of simulated character mesh 100 to provide a more detailed view of the spatial positioning and size relationship between main mesh 110 and mesh components 120A-C. As in FIG. 1A, main mesh 110 depicts the main body of the knight character, while mesh components 120A-C depict different components of the armor plating for the simulated character.

Figure 2:
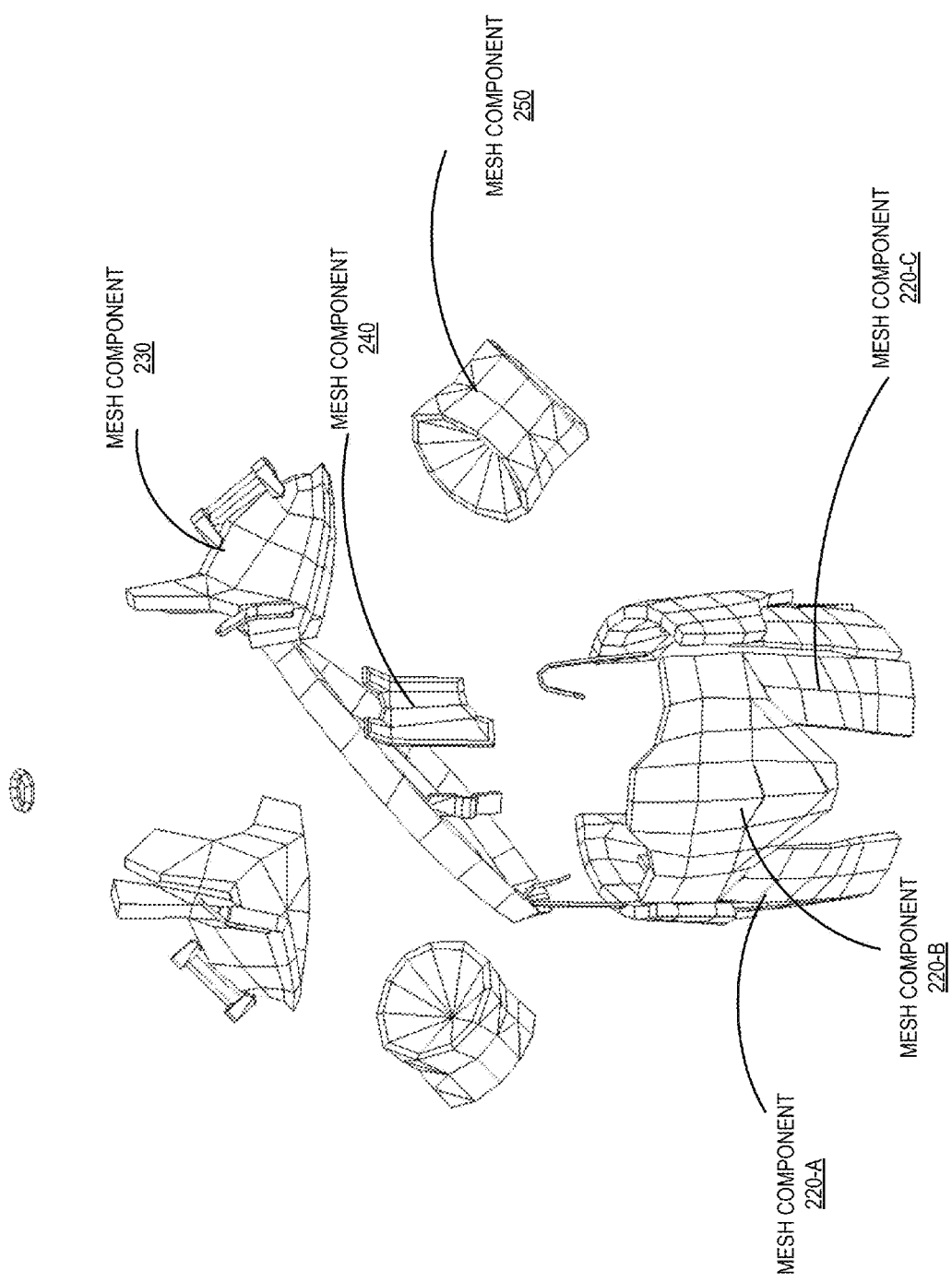
FIG. 2 illustrates an example of mesh components apart from an associated simulated character model, in accordance with one or more embodiments of the present disclosure.

FIG. 2 illustrates an example of mesh components apart from an associated simulated character model. As shown in FIG. 2, the mesh components 220A-C and mesh components 230-250 can correspond to the mesh components 120A-C and mesh components 130-150 of FIG. 1A.

Figure 3:
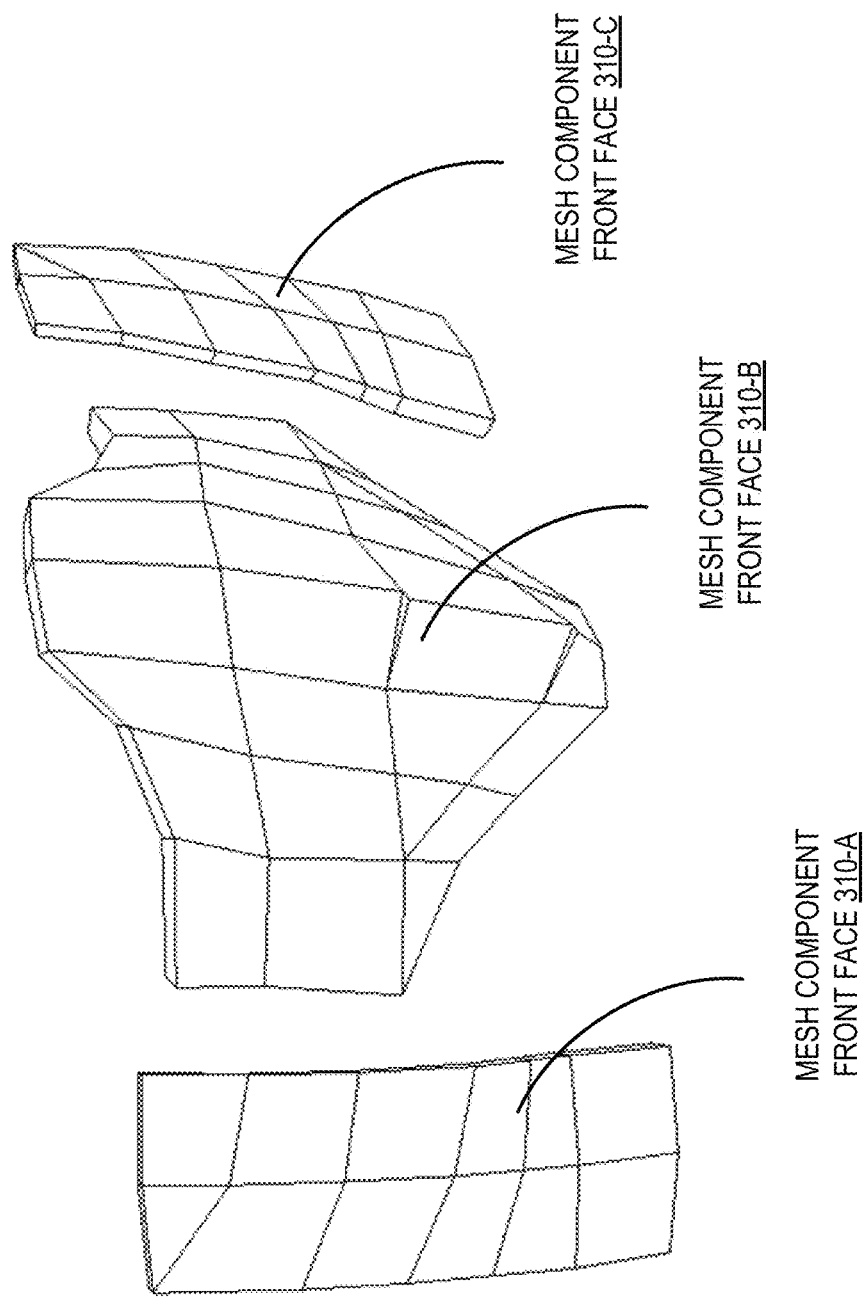
FIG. 3 illustrates a front view of mesh component front faces, in accordance with one or more embodiments of the present disclosure.

FIG. 3 illustrates a front view of mesh component front faces 310-A, 310-B, and 310-C. In one embodiment, mesh component front faces 310A-C correspond to mesh components 110A-C of FIG. 1 that depict portions of armor plating for the knight simulated character mesh of FIG. 1.

Figure 4:
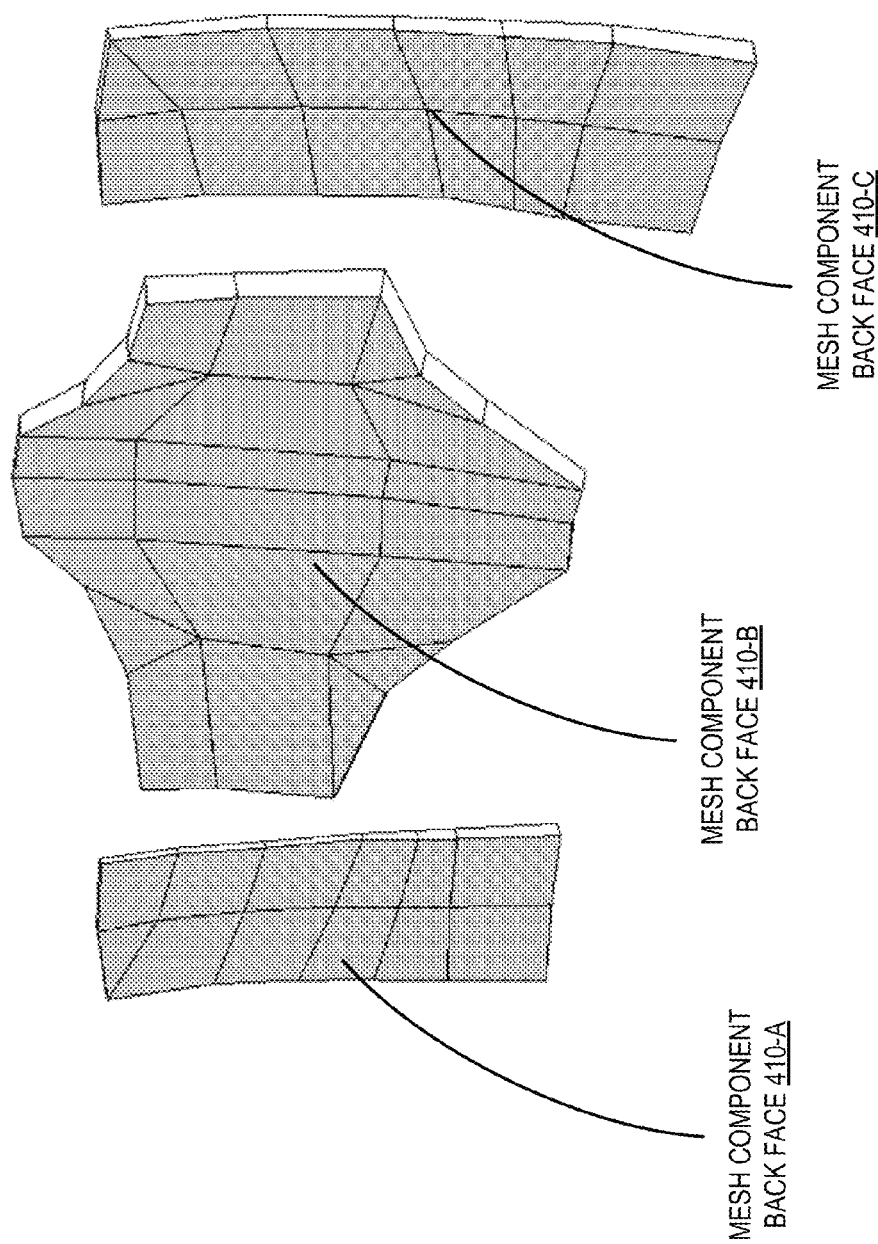
FIG. 4 illustrates the rear view of mesh component back faces, in accordance with one or more embodiments of the present disclosure.

FIG. 4 illustrates the rear view of mesh component back faces 410-A, 410-B, and 410-C. In one embodiment, mesh component back faces 410A-C correspond to mesh components 110A-C of FIG. 1 that depict portions of armor plating for the knight simulated character mesh of FIG. 1. Mesh component back faces 410-A, 410-B, and 410-C can represent the portions of mesh components 310-A, 310-B, and 310-C from FIG. 3 that overlap portions of a simulated character model (e.g., simulated character mesh 100 from FIG. 1) that can be removed using the simplification process as described above. The mesh components of FIG. 4 are "closed" components, as they depict components modeled to form a complete surface to enclose a defined volume. The mesh component back faces 410A-C depict the back surfaces of the mesh components that are positioned as touching the front surface of main mesh 110 of FIG. 1.

Figure 5:
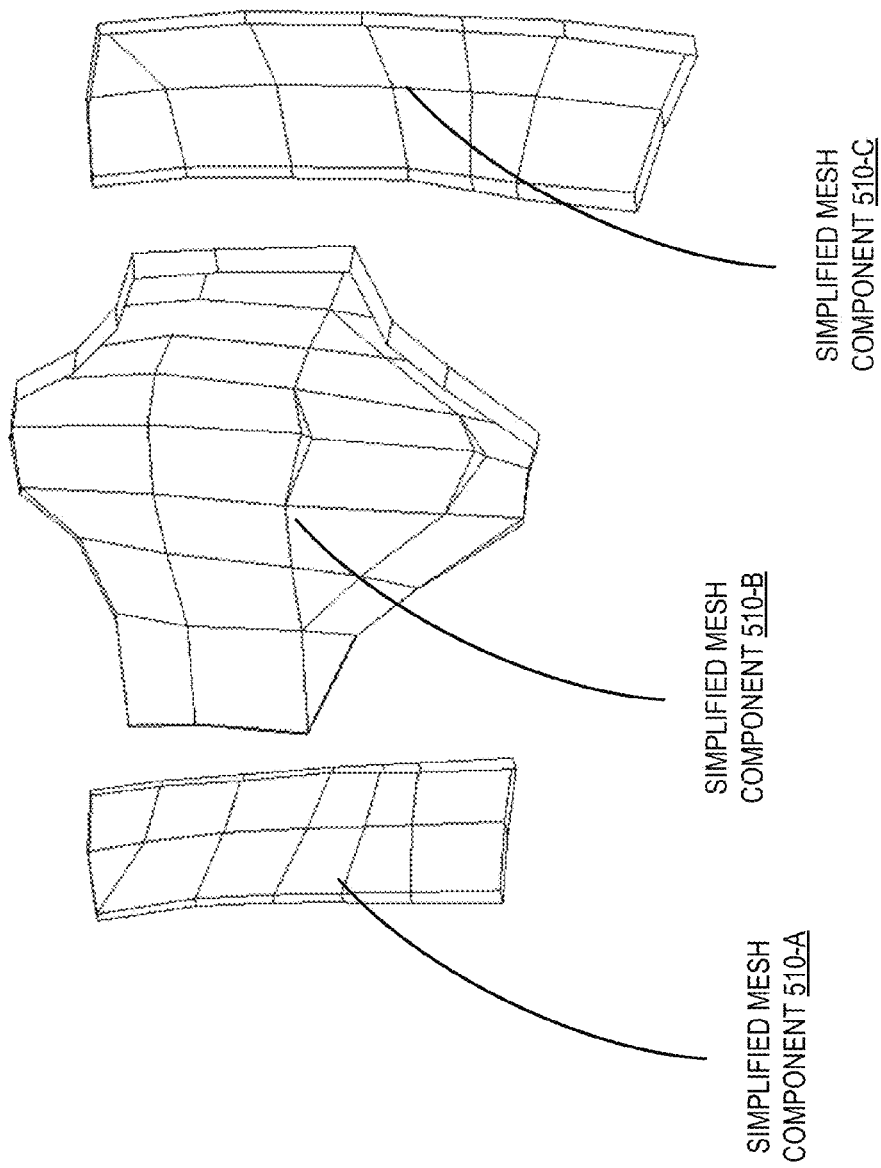
FIG. 5 illustrates the rear view of simplified mesh components, in accordance with one or more embodiments of the present disclosure.

FIG. 5 illustrates the rear view of simplified mesh components 510-A, 510-B, and 510-C. In one embodiment, simplified mesh components 510A-C correspond to the simplified versions of mesh components 110A-C of FIG. 1 that depict portions of armor plating for the knight simulated character mesh of FIG. 1. Simplified mesh components 510-A, 510-B, and 510-C can represent the resulting simplified mesh components that were automatically generated by applying the simplification method described above to the component back faces 410-A, 410-B, and 410-C from FIG. 4. The resulting simplified mesh components 510A-C possess fewer back faces than mesh component back faces 410A-C, showing the vertices of the front faces of the simplified components. Thus, the resulting simplified mesh components 510A-C are no longer "closed" components since the back faces have been removed.

FIGS. 6A-6D depict various examples of ray casting to determine intersection points of a mesh component with a larger mesh component (or main mesh). In embodiments of the present disclosure as described above, ray casting can be used to determine distance between components to determine whether a particular surface of a component is a back surface (back face) eligible for removal.

Figure 6A:
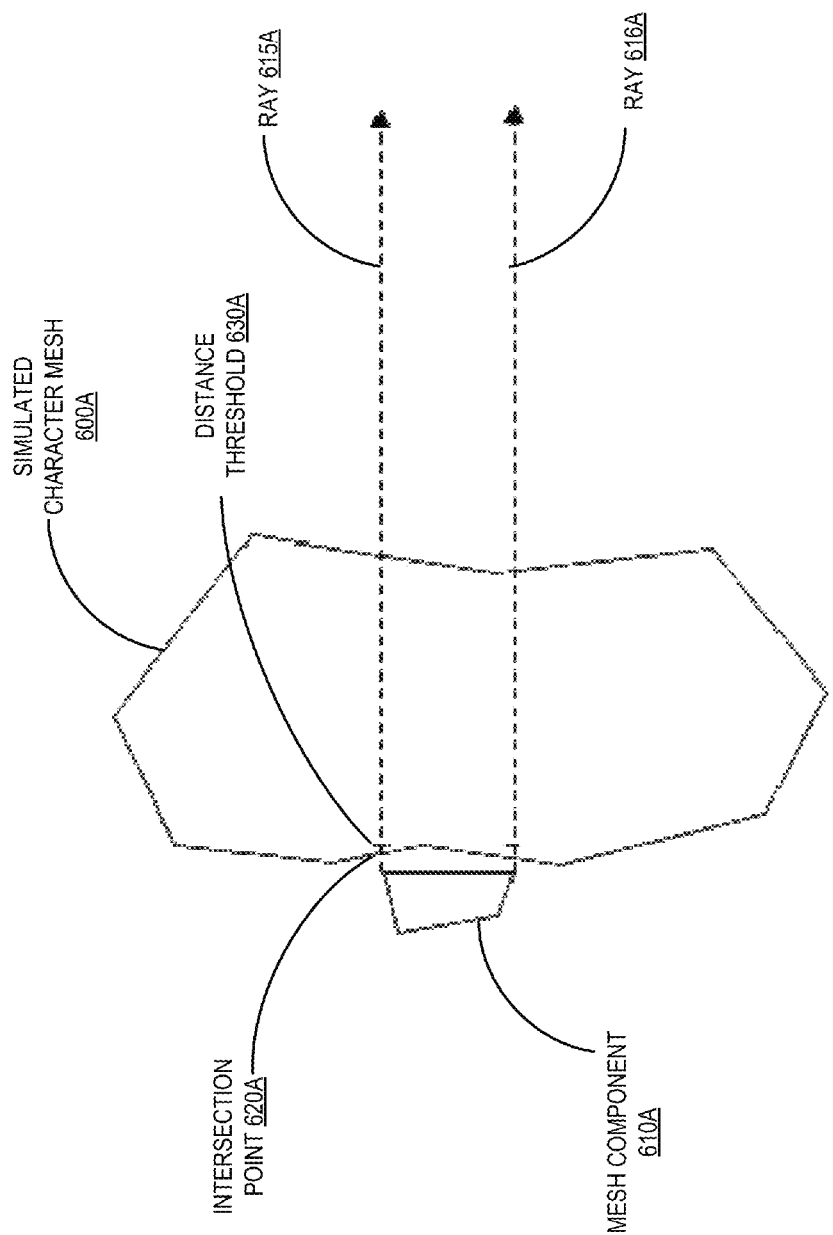
FIG. 6A illustrates a positive identification of a back face of mesh component in relation to a simulated character mesh, in accordance with one or more embodiments of the present disclosure.

FIG. 6A illustrates a positive identification of a back face of mesh component 610A in relation to simulated character mesh 600A. In some embodiments, mesh component 610A and simulated character mesh 600A may correspond to mesh components 120A-C and main mesh 110 of FIG. 1 respectively. As shown in FIG. 6A, rays 615A and 616A are cast from two vertices of mesh component 610A. Intersection point 620A represents the point where ray 615A intersects the surface of simulated character mesh 600A. Distance threshold 630A represents the predetermined threshold distance used by the mesh simplification system described above to determine whether mesh component 610A is sufficiently close to simulated character mesh 600A for the back surface of 610A to be eligible for removal. As shown in FIG. 6A, intersection point 620A occurs within the boundary of distance threshold 630A. Thus, the back surface of mesh component 610A is unlikely to be visible from many angles. Accordingly, the mesh simplification system may determine that the back surface of mesh component 610A is a back face eligible for removal.

FIG. 6B illustrates a back surface of a mesh component 610B that is not identified as a back face in relation to simulated character mesh 600B. In some embodiments, mesh component 610B and simulated character mesh 600B may correspond to mesh components 120A-C and main mesh 110 of FIG. 1 respectively. As shown in FIG. 6B, rays 615B and 616B are cast from two vertices of mesh component 610B. Intersection point 620B represents the point where ray 615B intersects the surface of simulated character mesh 600B. Distance threshold 630B represents the predetermined threshold distance used by the mesh simplification system described above to determine whether mesh component 610B is sufficiently close to simulated character mesh 600B for the back surface of 610B to be eligible for removal. As shown in FIG. 6B, intersection point 620B occurs outside the boundary of distance threshold 630B. Thus, the back surface of mesh component 610B is too far away from simulated character mesh 600B to be deemed a back face eligible form removal.

Figure 6C:
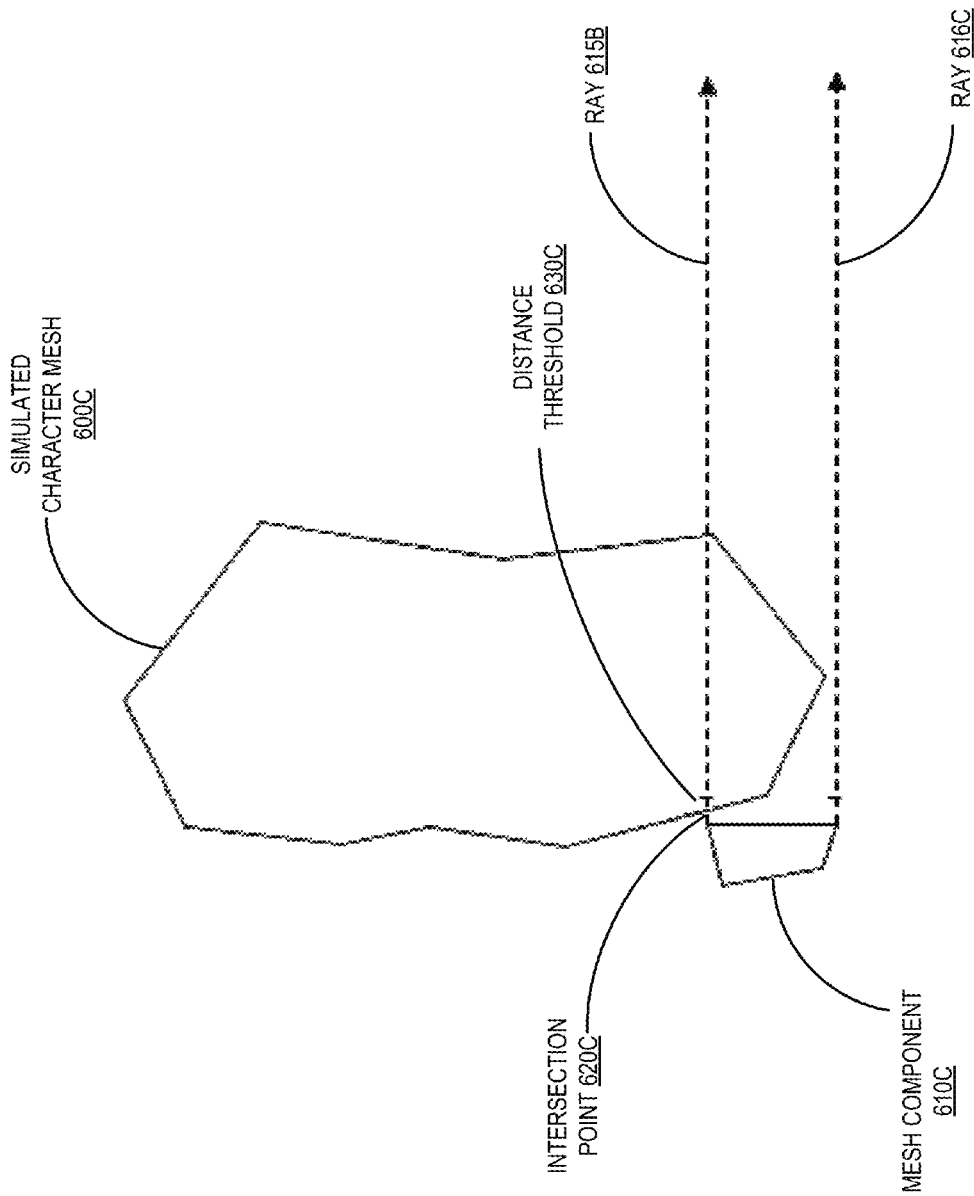
FIG. 6C illustrates a back surface of a mesh component that is identified as a back face in relation to a simulated character mesh, in accordance with one or more embodiments of the present disclosure.

FIG. 6C illustrates a back surface of a mesh component 610C that is not identified as a back face in relation to simulated character mesh 600C. In some embodiments, mesh component 610C and simulated character mesh 600C may correspond to mesh components 120A-C and main mesh 110 of FIG. 1 respectively. As shown in FIG. 6C, rays 615C and 616C are cast from two vertices of mesh component 610C. Intersection point 620C represents the point where ray 615B intersects the surface of simulated character mesh 600C. Distance threshold 630C represents the predetermined threshold distance used by the mesh simplification system described above to determine whether mesh component 610C is sufficiently close to simulated character mesh 600C for the back surface of 610C to be eligible for removal.

As shown in FIG. 6C, while intersection point 620C occurs within the boundary of distance threshold 630C, ray 616C does not intersect with any surface of simulated character mesh 600C. The back surface of mesh component 610C overlaps simulated character mesh 600C such that at least some portion of the back surface of mesh component 610C may be visible from some angles. Thus, the back surface of mesh component 610C has some portion that is too far away from a portion of the surface of simulated character mesh 600C to be deemed a back face eligible form removal.

Figure 6D:
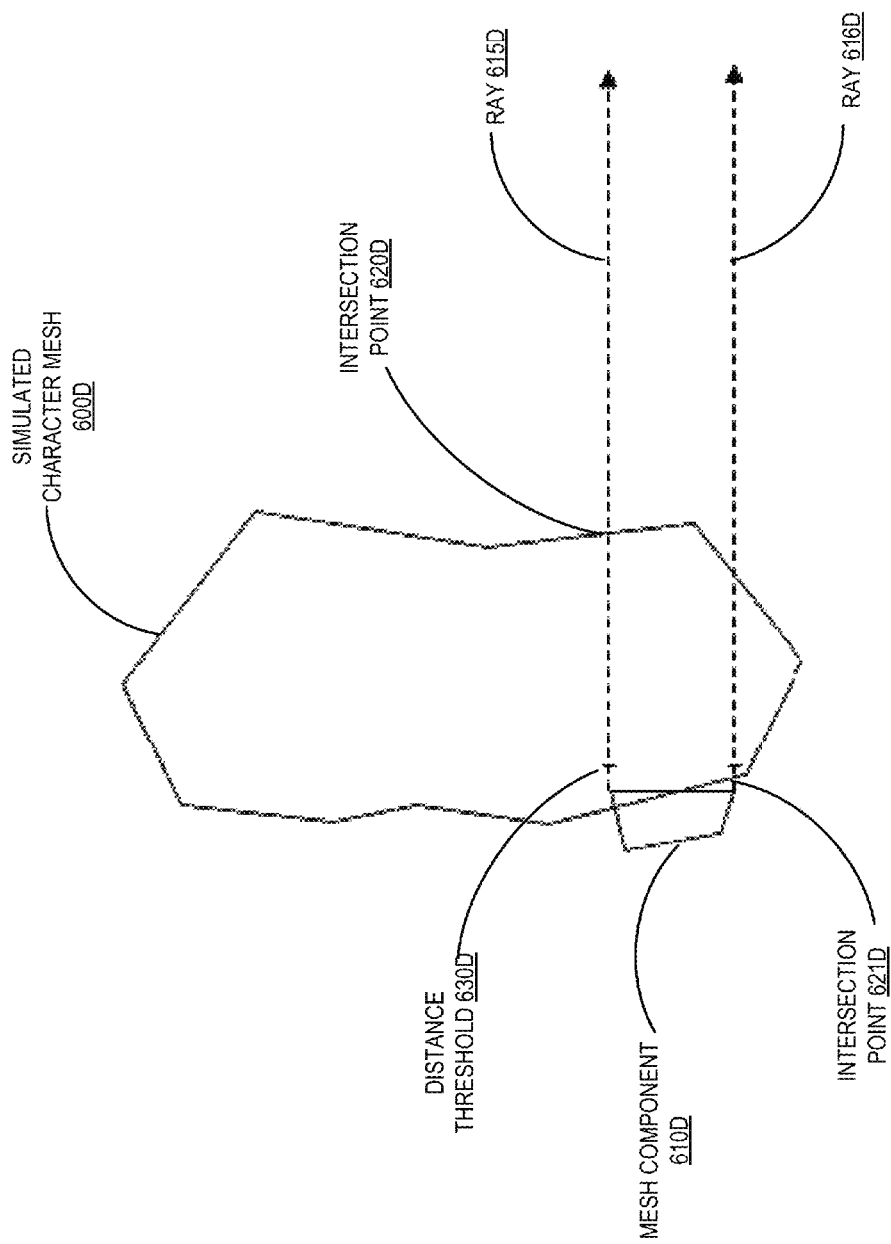
FIG. 6D illustrates a front view of mesh component front faces, in accordance with one or more embodiments of the present disclosure.

FIG. 6D illustrates a back surface of a mesh component 610D that is identified as a back face in relation to simulated character mesh 600D. In some embodiments, mesh component 610D and simulated character mesh 600D may correspond to mesh components 120A-C and main mesh 110 of FIG. 1 respectively. As shown in FIG. 6D, rays 615D and 616D are cast from two vertices of mesh component 610D. Intersection point 620D represents the point where ray 615D intersects the surface of simulated character mesh 600D. Intersection point 621D represents the point where ray 616D intersects the surface of simulated character mesh 600D. Distance threshold 630D represents the predetermined threshold distance used by the mesh simplification system described above to determine whether mesh component 610D is sufficiently close to simulated character mesh 600D for the back surface of 610D to be eligible for removal.

As shown in FIG. 6D, mesh component 610D is positioned such that a portion of it is positioned near the front surface of simulated character mesh 600D. This is depicted where ray 616D intersects simulated character mesh 600D at intersection point 621D. There is also at least some portion of mesh component 610D that is positioned such that it occupies 3D space within the space occupied by simulated character mesh 600D. This is depicted where ray 615D is cast from mesh component 610D. Since the vertex from which this ray is cast is already beyond the front surface of simulated character mesh 600D, the first intersection of ray 615D and any surface of simulated character mesh 600D is a back surface of simulated character mesh 600D. Since intersection point 620D is on a back surface, and it is the first point of intersection for ray 615D, the mesh simplification system can thus determine that this portion of mesh component 610D is "inside" the simulated character mesh 600D. Thus, the back surface of that portion of mesh component 610D is not likely to be visible from any angle. Accordingly, the mesh simplification system may determine that the back surface of mesh component 610D is a back face eligible for removal.

Figure 7A:
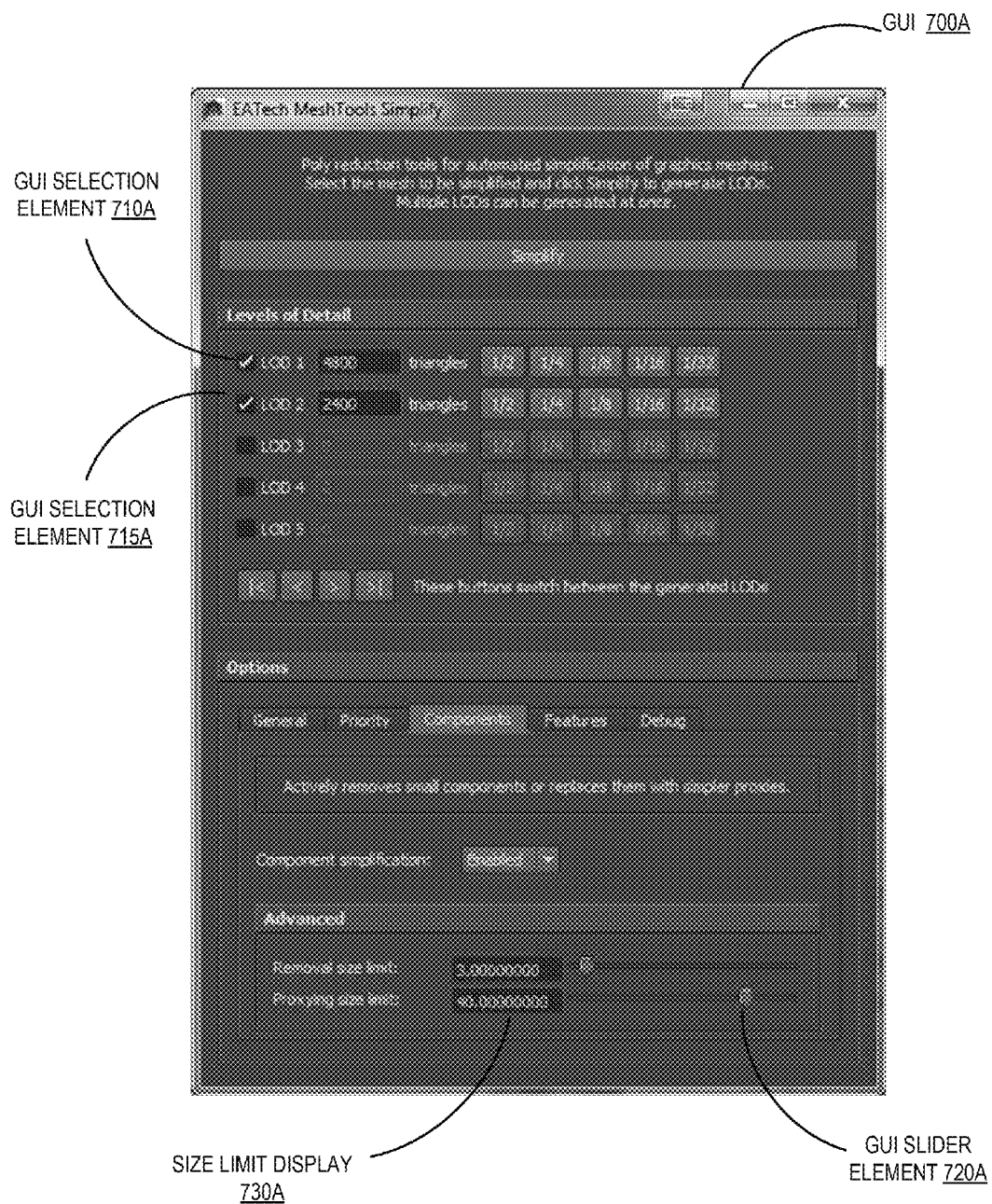
FIG. 7A illustrates an example GUI to select various level of detail simplification options, in accordance with one or more embodiments of the present disclosure.
Figure 7B:
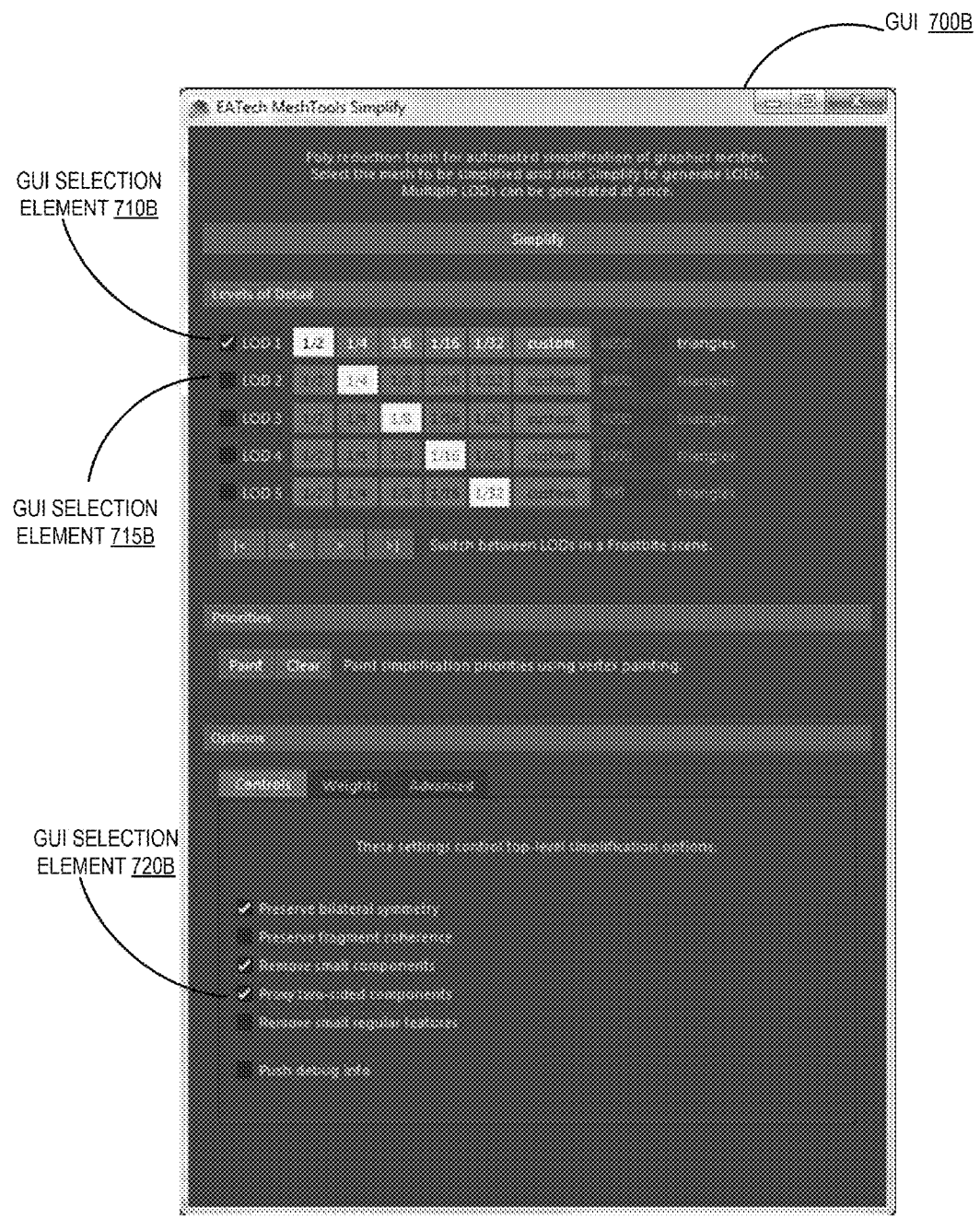
FIG. 7B illustrates an example GUI to select various level of detail simplification options, in accordance with one or more embodiments of the present disclosure.

FIGS. 7A-7B depict examples of graphical user interface (GUI) screens to control threshold sizes for use with mesh simplification as described above. FIG. 7A illustrates a GUI 700A that includes a GUI selection elements 710A, 715A to select various level of detail simplification options. These elements allow a user to select how many low-detail meshes to create based on the original mesh received as input to the mesh simplification system, as well as the target number of polygons (triangles) that may be used in each low-detail mesh. A user may select the GUI selection elements 710A, 715A to determine the attributes of one or more final simplified mesh produced by the mesh simplification system.

GUI slider element 720A may be used to adjust the size threshold used by the mesh simplification system to determine whether components are eligible for simplification. Size limit display 730A depicts the values altered by movement of the GUI slider element 720A. The units shown in size limit display 730A are depicted in centimeters, but in other implementations can be displayed in other units of measure.

FIG. 7B illustrates a GUI 700B that includes a GUI selection elements 710B, 715b to select various level of detail simplification options. As in FIG. 7A, these elements allow a user to select how many low-detail meshes to create based on the original mesh received as input to the mesh simplification system, as well as the target number of polygons (triangles) that may be used in each low-detail mesh. A user may select the GUI selection elements 710B, 715B to determine the attributes of one or more final simplified mesh produced by the mesh simplification system.

GUI selection element 720B may be used to enable or disable mesh simplification for components with redundant backs without modifying the threshold sizes. In some implementations, the maximum threshold size for eligible components may be determined automatically based on the overall surface area size of the mesh received as input to the simplification process as well as the level of detail selected by the user for the simplified mesh via GUI selection elements 710B, 715B.

Figure 8:
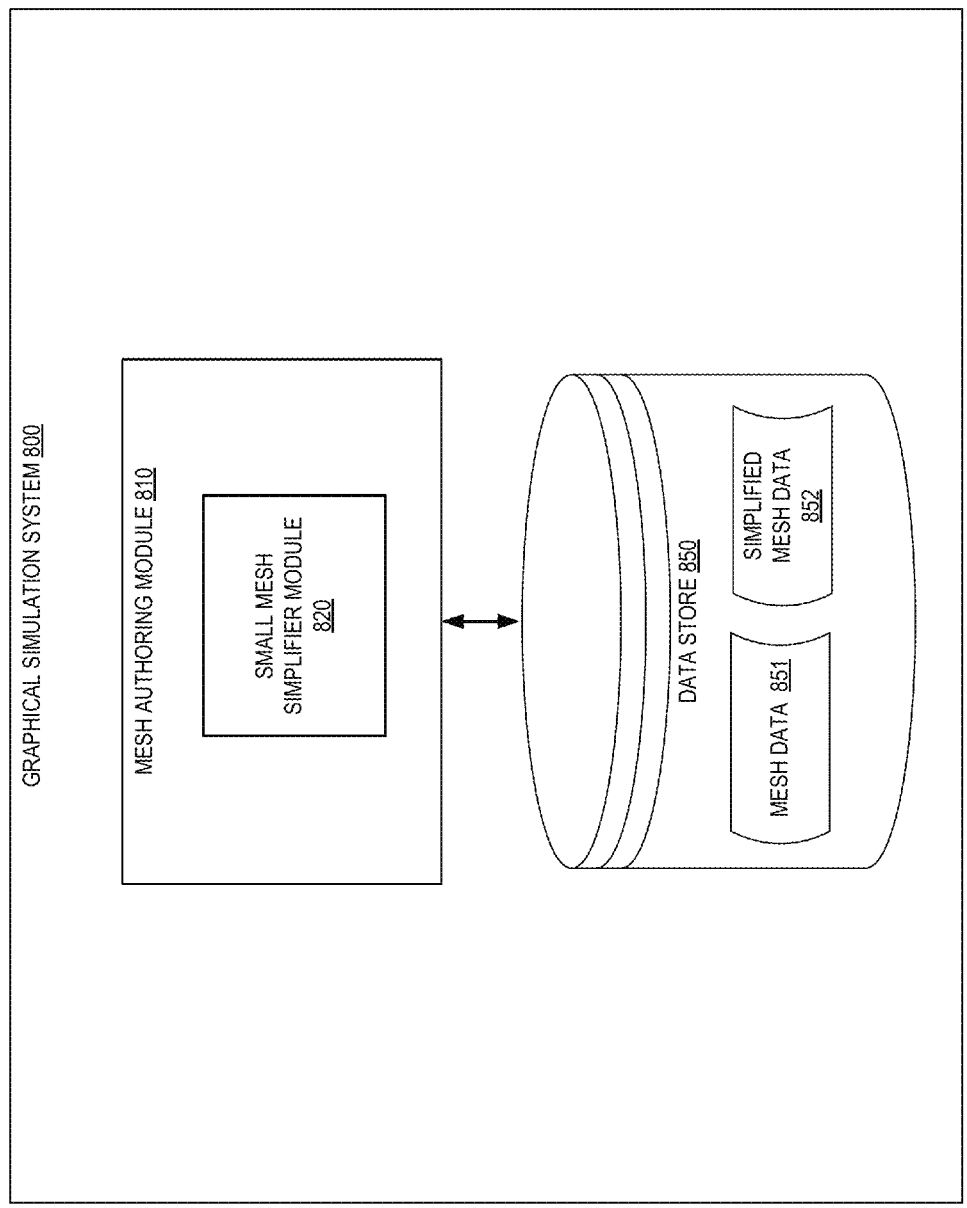
FIG. 8 depicts a high-level component diagram of an example graphical simulation system architecture, in accordance with one or more embodiments of the present disclosure.

FIG. 8 depicts a high-level component diagram of an illustrative example of a graphical simulation system 800, in accordance with one or more embodiments of the present disclosure. One skilled in the art will appreciate that other architectures for graphical simulation system 800 are possible, and that the implementation of a computer system utilizing examples of the invention are not necessarily limited to the specific architecture depicted by FIG. 8.

As shown in FIG. 8, the graphical simulation system 800 may include a mesh authoring module 810 and a data store 850 (e.g., one or more magnetic hard disk drives, a Universal Serial Bus [USB] solid state drive, a Redundant Array of Independent Disks [RAID] system, a network attached storage [NAS] array, etc.). The graphical simulation system 800 may be a server, a mainframe, a workstation, a personal computer (PC), a mobile phone, a palm-sized computing device, etc. Graphical simulation system 800 can generate and maintain meshes of 3D simulated characters for use in a video game or other graphical simulation. For example, graphical simulation system can be accessed by a user via a graphical user interface to create a simulated character for use in a video game. Alternatively, graphical simulation system may be used as a component of an authoring system to generate simplified versions of 3D meshes that are used as input to other graphical simulation systems.

Mesh authoring module 810 can be used by artists to create and manage 3D polygonal meshes for use with graphical simulations. In certain implementations, mesh authoring module 810 may be invoked by a graphical user interface to edit mesh attributes of a simulated character.

Mesh authoring module 810 may additionally small mesh simplifier module 820 that can automatically generate simplified versions of mesh components by removing redundant back faces, as described in detail below with respect to FIGS. 9-14. It should be noted that in some alternative implementations, small mesh simplifier module 820 may be external to mesh authoring module 810, rather than embedded within mesh authoring module 810, or may replace mesh authoring module 810.

Data store 850 can store information related to a 3D polygonal mesh that may be modified by small mesh simplifier module 820. Data store 850 may include mesh data 851, which can store the original mesh data for a simulated character in graphical simulation system 800. Data store 850 may additionally simplified mesh data 852, which can store the mesh data for simplified, low-detail versions of the mesh after the mesh simplification process has been used on the original mesh data. Information from data store 850 can be accessed by small mesh simplifier module 820 to automatically generate simplified versions of mesh components, as described in detail below with respect to FIGS. 9-14.

Figure 9:
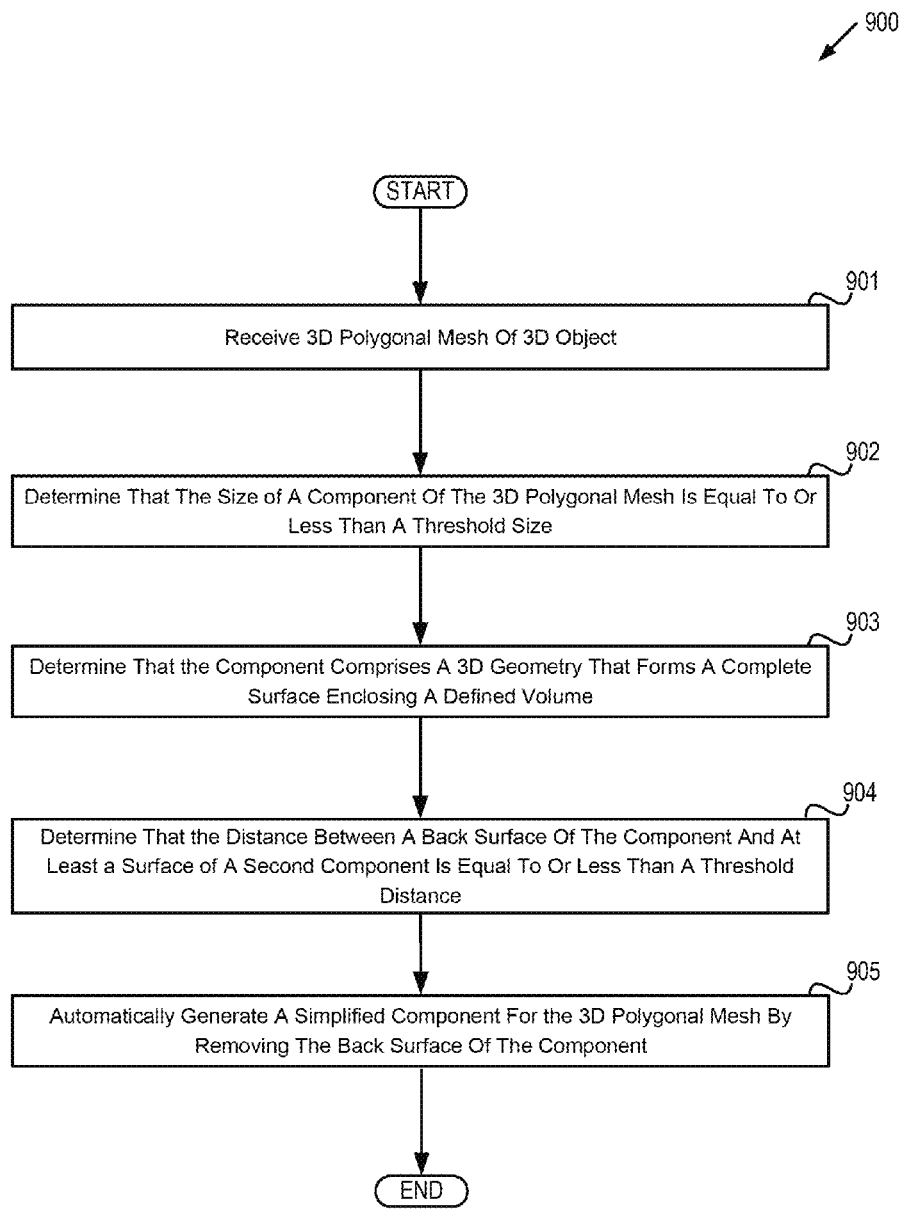
FIG. 9 depicts a flow diagram of an example method for simplifying small mesh components with redundant backs, in accordance with one or more embodiments of the present disclosure.

FIG. 9 depicts a flow diagram of an example method 900 for simplifying small mesh components with redundant backs. The method may be performed by processing logic that may comprise hardware (circuitry, dedicated logic, etc.), software (such as is run on a general purpose computer system or a dedicated machine), or a combination of both. In one illustrative example, method 900 may be performed by small mesh simplifier module 820 in FIG. 8. Alternatively, some or all of method 900 might be performed by another module or machine. It should be noted that blocks depicted in FIG. 9 could be performed simultaneously (at least partially overlapping in time) or in a different order than that depicted.

At block 901, processing logic receives a 3D polygonal mesh of a 3D object. The 3D polygonal mesh may be a representation of a 3D object that is made up of topologically interconnected polyhedral planar facets of a planar surface approximation of the 3D object. In some implementations, the mesh can be received from an authoring tool used by a user (e.g., an artist) for creating the 3D object. In some implementations, the 3D polygonal mesh can be made up of multiple components, where a component can be a set of topologically interconnected surfaces that are modeled as a separate structure from other portions of the mesh.

At block 902, processing logic determines that the size of a component of the 3D polygonal mesh is equal to or less than a threshold size, where the threshold size is a percentage of at least a portion of a surface area of the 3D polygonal mesh. In an illustrative example, the percentage of the portion of the surface area of the 3D polygonal mesh may be a second component, as further described below with respect to FIG. 10. In another illustrative example, the percentage of the portion of the surface area of the 3D polygonal mesh may be the total surface area of the 3D polygonal mesh, as further described below with respect to FIG. 11.

At block 903, processing logic determines that the component comprises a 3D geometry that forms a complete surface enclosing a defined volume without any gaps. Components constructed in this fashion can be a strong indicator that it may be an object modeled with two sides, and thus possesses a surface that may be eligible for removal.

At block 904, processing logic determines that the distance between a back surface of the component and at least a surface of a second component is equal to or less than a threshold distance. In some implementations, the portion of the linear size of the 3D polygonal mesh used to calculate the threshold distance may be the linear size of an additional component. Alternatively, the linear size of the entire 3D polygonal mesh (e.g., the entire portion of the 3D polygonal mesh) may be used to calculate the threshold distance. The linear size may be measured in inches, fractions of inches, centimeters, millimeters, or any other unit of measure. In an illustrative example, processing logic makes this determination as further described below with respect to FIG. 12.

At block 905, processing logic automatically generates (e.g., without user interaction) a simplified component for the 3D polygonal mesh by removing the back surface of the component. In some implementations, the 3D polygonal mesh is stored as a collection of faces (e.g., in a database, a list, or the like) that are each associated with an index (or handle) to provide the system with the ability to modify the attributes of a face. Processing logic may remove the face by invoking the appropriate handle associated with the face to delete the face from the mesh. Thus the simplified component retains the structural elements of the front surfaces of the original component without the back surfaces that would be obscured by the main part of the mesh (or an additional component) due to the component being positioned close to the main mesh (or additional component).

In some implementations, processing logic at block 905 may include additional safeguards to insure that removal of back surfaces does not result in a poorly-formed mesh. In an illustrative example, processing logic may determine whether removing the back surface from the component may introduce non-manifold topology to a resulting simplified component. One example of non-manifold topology is when a vertex of a component is incident to two or more locally disconnected faces of the component (i.e. the vertex is incident to two or more groups of faces, where all the faces in each group include the vertex, and are connected by shared edges, but the different groups do not share any edges). Such a vertex can be defined as being a non-manifold vertex. Prior to removing a back surface from the component, processing logic can model the resulting structure with the surface removed to determine whether the removal could result in a non-manifold topology. Responsive to determining that removing the surface would result in a non-manifold topology, processing logic could retain the back surface as part of the simplified component rather than remove it. After block 905, the method of FIG. 9 terminates.

Figure 10:
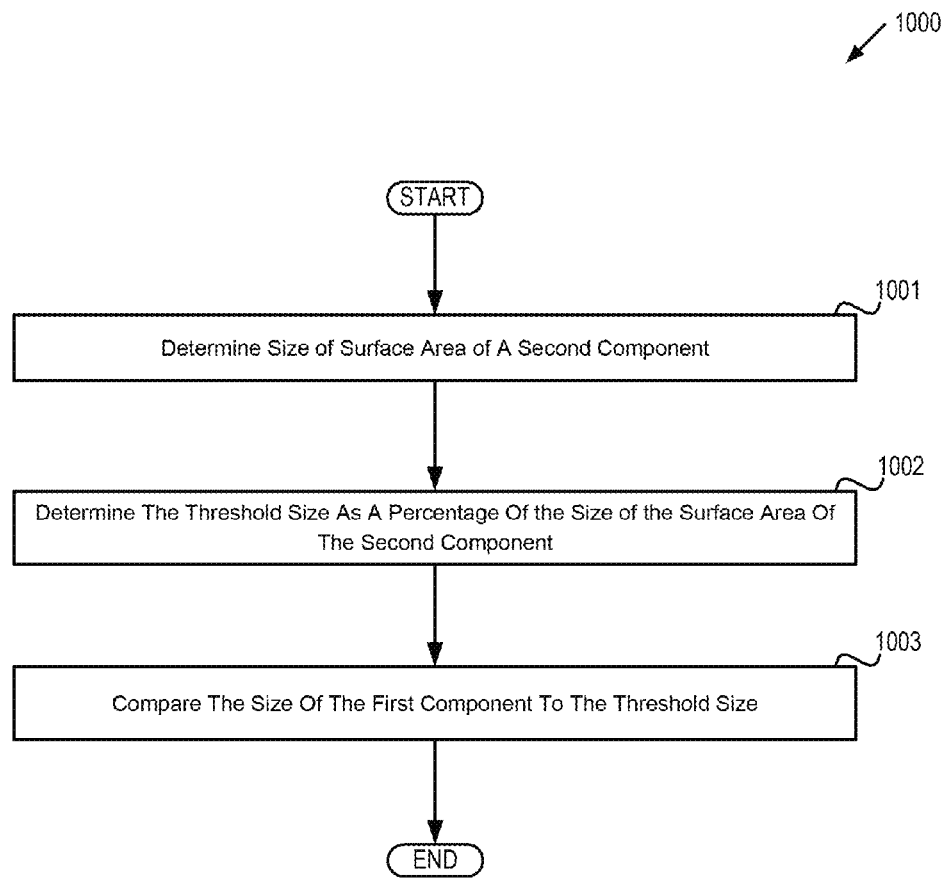
FIG. 10 depicts a flow diagram of an example method for determining a threshold size for mesh simplification based on the size of a second component, in accordance with one or more embodiments of the present disclosure.

FIG. 10 depicts a flow diagram of an example method 1000 for determining a threshold size for mesh simplification based on the size of a second component. The method may be performed by processing logic that may comprise hardware (circuitry, dedicated logic, etc.), software (such as is run on a general purpose computer system or a dedicated machine), or a combination of both. In one illustrative example, method 1000 may be performed by small mesh simplifier module 820 in FIG. 8. Alternatively, some or all of method 1000 might be performed by another module or machine. It should be noted that blocks depicted in FIG. 10 could be performed simultaneously (at least partially overlapping in time) or in a different order than that depicted.

At block 1001, processing logic determines the size of the surface area of a second component associated with the 3D polygonal mesh. The surface area may be measured in square inches ($in^2$), square centimeters ($cm^2$), square millimeters ($mm^2$), or any other unit of measure that represents a measurement of area. In some implementations, the surface area of the 3D polygonal mesh may be computed by first computing the value of the surface area of each individual face in the mesh and then adding the computed values together. The surface area of a face may be computed by first subdividing the face into one or more triangles (if the face was not already triangular) by adding additional edges between non-connected vertices. The area of each triangular face could then be calculated by computing half of the magnitude of a vector cross-product of two vectors that represent any two edges of the triangle.

At block 1002, processing logic determines the threshold size as a percentage of the size of the surface area of the second component. For example, the threshold size may be set to a value that is five percent of the surface area size of the second component. At block 1003, processing logic compares the size of the first component to the threshold size. If the size of the component is less than or equal to the threshold size, then the component may be deemed a small component, and thus be eligible for simplification. After block 1003, the method of FIG. 10 terminates.

Figure 11:
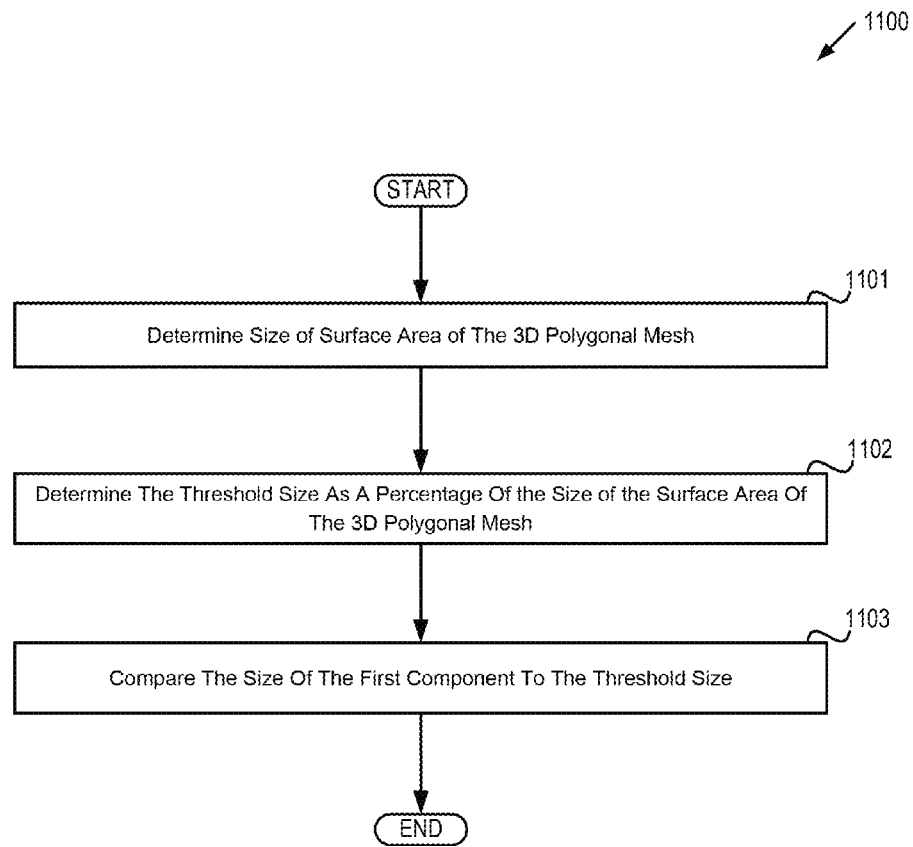
FIG. 11 depicts a flow diagram of an example method for determining a threshold size for mesh simplification based on the total size of a 3D polygonal mesh, in accordance with one or more embodiments of the present disclosure.

FIG. 11 depicts a flow diagram of an example method 1100 for determining a threshold size for mesh simplification based on the total size of a 3D polygonal mesh. The method may be performed by processing logic that may comprise hardware (circuitry, dedicated logic, etc.), software (such as is run on a general purpose computer system or a dedicated machine), or a combination of both. In one illustrative example, method 1100 may be performed by small mesh simplifier module 820 in FIG. 8. Alternatively, some or all of method 1100 might be performed by another module or machine. It should be noted that blocks depicted in FIG. 11 could be performed simultaneously (at least partially overlapping in time) or in a different order than that depicted.

At block 1101, processing logic determines the total size of the surface area of the 3D polygonal mesh. The surface area may be measured in square inches (in$^2$), square centimeters (cm$^2$), square millimeters (mm$^2$), or any other unit of measure that represents a measurement of area. In some implementations, the surface area of the 3D polygonal mesh may be computed by first computing the value of the surface area of each individual face in the mesh and then adding the computed values together. The surface area of a face may be computed by first subdividing the face into one or more triangles (if the face was not already triangular) by adding additional edges between non-connected vertices. The area of each triangular face could then be calculated by computing half of the magnitude of a vector cross-product of two vectors that represent any two edges of the triangle.

At block 1102, processing logic determines the threshold size as a percentage of the size of the surface area of the 3D polygonal mesh. For example, the threshold size may be set to a value that is five percent of the surface area size of the 3D polygonal mesh (e.g., the size of the main mesh and all associated components). At block 1103, processing logic compares the size of the first component to the threshold size. After block 1103, the method of FIG. 11 terminates.

Figure 12:
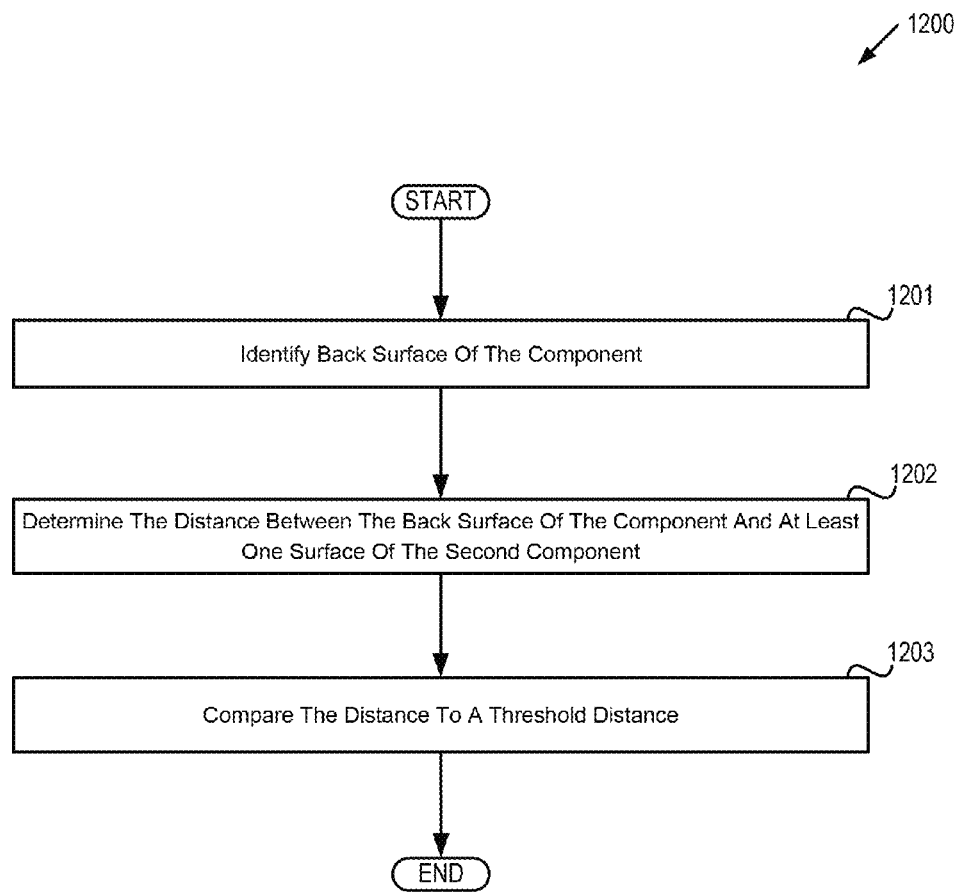
FIG. 12 depicts a flow diagram of an example method for determining if a component is eligible for simplification based on distance from another component e, in accordance with one or more embodiments of the present disclosure.

FIG. 12 depicts a flow diagram of an example method 1200 for determining if a component is eligible for simplification based on distance from another component. The method may be performed by processing logic that may comprise hardware (circuitry, dedicated logic, etc.), software (such as is run on a general purpose computer system or a dedicated machine), or a combination of both. In one illustrative example, method 1200 may be performed by small mesh simplifier module 820 in FIG. 8. Alternatively, some or all of method 1200 might be performed by another module or machine. It should be noted that blocks depicted in FIG. 12 could be performed simultaneously (at least partially overlapping in time) or in a different order than that depicted.

At block 1201, processing logic identifies a back surface of the component. In illustrative examples, processing logic may make this identification as described below with respect to FIGS. 13 and 14. At block 1202, processing logic determines the distance between the back surface of the component and at least one surface of the second component. At block 1203, processing logic compares the distance to a threshold distance. The threshold distance may be a percentage of at least a portion of the linear size of the 3D polygonal mesh. In some implementations, the portion of the linear size of the 3D polygonal mesh used to calculate the threshold distance may be the linear size of an additional component. Alternatively, the linear size of the entire 3D polygonal mesh (e.g., the entire portion of the 3D polygonal mesh) may be used to calculate the threshold distance. The linear size may be measured in inches, fractions of inches, centimeters, millimeters, or any other unit of measure. Responsive to determining that the distance between the back surface of the component and at least one surface of the second component is less than or equal to a threshold distance, processing logic may identify the back surface as eligible for removal from the component. After block 1203, the method of FIG. 12 terminates.

Figure 13:
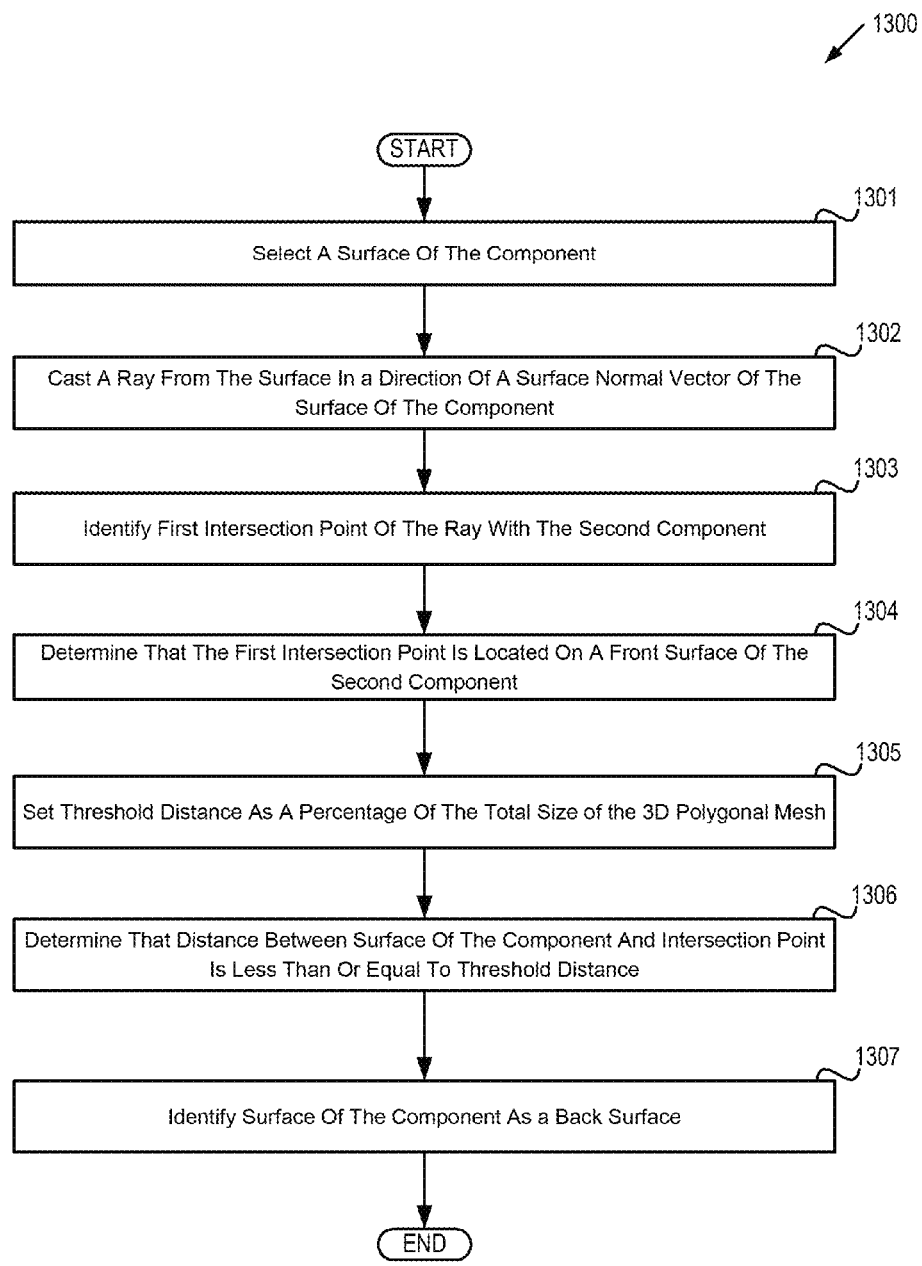
FIG. 13 depicts a flow diagram of an example method for identifying an eligible back surface of a component that may be removed, in accordance with one or more embodiments of the present disclosure.

FIG. 13 depicts a flow diagram of an example method 1300 for identifying an eligible back surface of a component that may be removed. The method may be performed by processing logic that may comprise hardware (circuitry, dedicated logic, etc.), software (such as is run on a general purpose computer system or a dedicated machine), or a combination of both. In one illustrative example, method 1300 may be performed by small mesh simplifier module 820 in FIG. 8. Alternatively, some or all of method 1300 might be performed by another module or machine. It should be noted that blocks depicted in FIG. 13 could be performed simultaneously (at least partially overlapping in time) or in a different order than that depicted.

At block 1301, processing logic selects a surface of the component (e.g., one of the faces of the component mesh). At block 1302, processing logic casts a ray from the surface in the direction of a surface normal vector of the surface of the component. The surface normal vector is a vector that is perpendicular to a plane that is tangent to the geometry of the identified surface. In alternative embodiments, rays may be cast in multiple directions from the tangent plane rather than just in the direction of the surface normal vector. At block 1303, processing logic identifies the first intersection point of the ray with the second component (or with the main mesh) that is closest in distance to the start of the ray.

At block 1304, processing logic determines that the first intersection point is located on a front surface of the second component (or main mesh). At block 1305, processing logic sets a threshold distance as a percentage of the total size of the 3D polygonal mesh. The threshold distance may be a percentage of at least a portion of the size of the 3D polygonal mesh. In some implementations, the portion of the size of the 3D polygonal mesh used to calculate the threshold distance may be the size of an additional component. Alternatively, the size of the entire 3D polygonal mesh (e.g., the entire portion of the 3D polygonal mesh) may be used to calculate the threshold distance. The size may be measured in inches, fractions of inches, centimeters, millimeters, or any other unit of measure.

At block 1306, processing logic determines that the distance between the surface of the component selected at block 1301 and the intersection point is less than or equal to the threshold distance. At block 1307, processing logic identifies the surface of the component as a back surface eligible to be removed. After block 1307, the method of FIG. 13 terminates.

Figure 14:
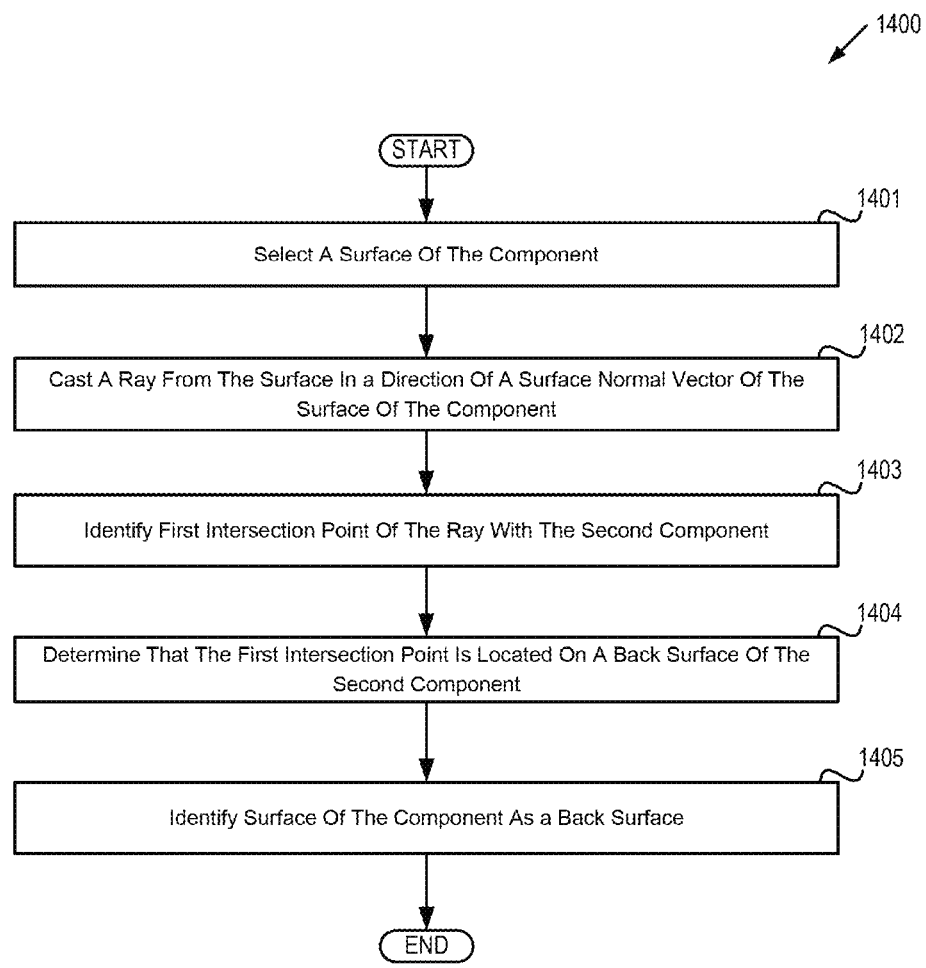
FIG. 14 depicts a flow diagram of an example method for identifying an eligible back surface of a component that may be removed, in accordance with one or more embodiments of the present disclosure.

FIG. 14 depicts a flow diagram of an example method 1400 for identifying an eligible back surface of a component that may be removed. The method may be performed by processing logic that may comprise hardware (circuitry, dedicated logic, etc.), software (such as is run on a general purpose computer system or a dedicated machine), or a combination of both. In one illustrative example, method 1400 may be performed by small mesh simplifier module 820 in FIG. 8. Alternatively, some or all of method 1400 might be performed by another module or machine. It should be noted that blocks depicted in FIG. 14 could be performed simultaneously (at least partially overlapping in time) or in a different order than that depicted.

At block 1401, processing logic selects a surface of the component (e.g., one of the faces of the component mesh). At block 1402, processing logic casts a ray from the surface in the direction of a surface normal vector of the surface of the component. The surface normal vector is a vector that is perpendicular to a plane that is tangent to the geometry of the identified surface. In alternative embodiments, rays may be cast in multiple directions from the tangent plane rather than just in the direction of the surface normal vector. At block 1403, processing logic identifies the first intersection point of the ray with the second component.

At block 1404, processing logic determines that the first intersection point is located on a back surface of the second component (or main mesh). This may occur when the component is positioned such that the back surface of the component overlaps the front surface of the main mesh (or additional component). In this situation, the system may identify the surface of the component as a back surface regardless of the distance between the surface of the component and the intersection point of the ray with the second component (or main mesh). At block 1405, processing logic identifies the surface of the component as a back surface eligible to be removed. After block 1405, the method of FIG. 14 terminates.

Figure 15:
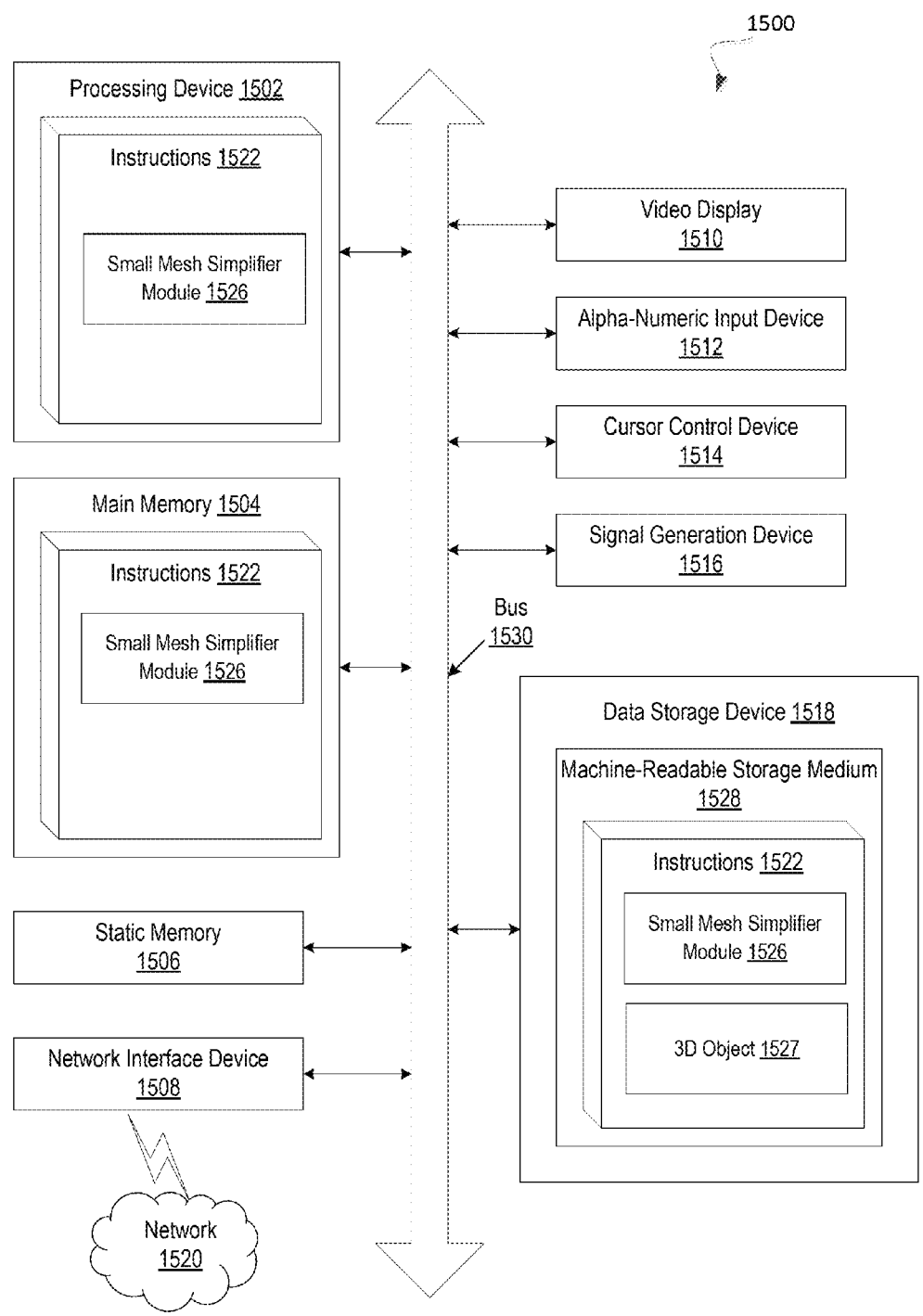
FIG. 15 depicts a block diagram of an illustrative computer system operating in accordance with one or more embodiments of the present disclosure.

FIG. 15 depicts an example computer system 1500 which can perform any one or more of the methods described herein. In one example, computer system 1500 may correspond to graphical simulation system 800 of FIG. 8. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The example computer system 1500 includes a processing device 1502, a main memory 1504 (e.g., read-only memory (ROM), flash memory, dynamic random access memory (DRAM) such as synchronous DRAM (SDRAM)), a static memory 1506 (e.g., flash memory, static random access memory (SRAM)), and a data storage device 1518, which communicate with each other via a bus 1530.

Processing device 1502 represents one or more general-purpose processing devices such as a microprocessor, central processing unit (CPU), graphical processing unit (GPU), or the like. More particularly, the processing device 1502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1502 may also be one or more special-purpose processing devices such as an application specific integrated circuit (ASIC), a field programmable gate array (FPGA), a digital signal processor (DSP), network processor, or the like. The processing device 1502 is configured to execute instructions 722 that can include small mesh simplifier module 1526 for performing the operations and steps discussed herein (e.g., corresponding to the methods of FIGS. 9-14, etc.).

The computer system 1500 may further include a network interface device 1508. The computer system 1500 also may include a video display unit 1510 (e.g., a liquid crystal display (LCD) or a cathode ray tube (CRT)), an alphanumeric input device 1512 (e.g., a keyboard), a cursor control device 1514 (e.g., a mouse), and a signal generation device 1516 (e.g., a speaker). In one illustrative example, the video display unit 1510, the alphanumeric input device 1512, and the cursor control device 1514 may be combined into a single component or device (e.g., an LCD touch screen).

The data storage device 1518 may include a computer-readable medium 1528 on which is stored one or more sets of instructions or software 722 such as small mesh simplifier module 1526 (e.g., corresponding to the methods of FIGS. 9-14, etc.) embodying any one or more of the methodologies or functions described herein. Small mesh simplifier module 1026 may also reside, completely or at least partially, within the main memory 1504 and/or within the processing device 1502 during execution thereof by the computer system 1500, the main memory 1504 and the processing device 1502 also constituting computer-readable media. Small mesh simplifier module 1026 may further be transmitted or received over a network via the network interface device 1522. Instructions 1522 may additionally include 3D object 1527, embodying a 3D polygonal mesh embodying any one or more of the original or simplified 3D objects as described herein. In some embodiments, 3D object 1527 may be a representation of a 3D object automatically generated by the small mesh simplifier module 1526 (e.g., corresponding to the methods of FIGS. 9-14, etc.) embodying any one or more of the methods or operations described herein.

While the computer-readable storage medium 1528 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled. Particularly, while embodiments of the present disclosure have been described above as applying to polygonal models, these embodiments can also be applied in a similar manner to other three dimensional surface representation structures such as nurbs, splines, subdivision surfaces, etc.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "identifying," "generating," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

Embodiments of the present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   receiving, by a processing device, a three-dimensional (3D) polygonal mesh comprising topologically interconnected polyhedral planar facets representing a planar surface approximation of a 3D object, wherein the 3D polygonal mesh comprises a first component and a second component, wherein the first component is topologically isolated from the second component;
   casting a ray from a surface of the first component in a direction of a surface normal vector of the surface;
   identifying an intersection point of the ray with the second component, wherein the intersection point is closest, among two or more intersection points of the ray with the second component, to a start of the ray;
   determining that the intersection point is located on a front surface of the second component;
   responsive to determining that a distance between the surface and the intersection point is less than a threshold distance, removing the surface from the first component to produce a simplified component comprising fewer interconnected polyhedral planar facets than the first component.

2. The method of claim 1, further comprising:
   determining that a first surface area of the first component is less than a threshold area, wherein the threshold area is a share of at least a portion of a surface area of the 3D polygonal mesh comprising a surface area of the second component.

3. The method of claim 2, wherein determining that the first size surface area of the first component is less than the threshold area comprises:
   determining a second surface area of the second component;
   determining the threshold area as a share of the second surface area; and
   comparing the first surface area to the threshold area.

4. The method of claim 2, wherein the portion of the surface area of the 3D polygonal mesh comprises a total surface area of the 3D polygonal mesh.

5. The method of claim 2, wherein determining that the first size surface area of the first component is less than the threshold area comprises:
  determining a total surface area of the 3D polygonal mesh;
  determining the threshold area as a share of the total surface area of the 3D polygonal mesh; and
  comparing the first surface area to the threshold area.

6. The method of claim 1, further comprising:
  identifying the surface as a back surface of the first component.

7. The method of claim 1, further comprising:
  setting the threshold distance as a share of a linear size of the 3D polygonal mesh.

8. The method of claim 1, further comprising:
  responsive to determining that removing the surface from the first component introduces a non-manifold topology to the simplified component, wherein the non-manifold topology comprises a first vertex of a first component that is incident to two or more locally disconnected surfaces of the first component, retaining the surface as part of the simplified component.

9. A method comprising:
  identifying, by a processing device, a component of a three-dimensional (3D) polygonal mesh, wherein the component comprises a set of topologically interconnected surfaces;
  casting a ray from a surface of the component in a direction of a surface normal vector of the surface;
  identifying an intersection point of the ray with the 3D polygonal mesh, wherein the intersection point is closest, among two or more intersection points of the ray with the 3D polygonal mesh, to a start of the ray; and
  responsive to determining that a distance between the surface and the intersection point is less than a threshold distance, removing the surface from the component to produce a simplified component.

10. The method of claim 9, further comprising:
  setting a threshold surface area as a share of the total surface area of the 3D polygonal mesh; and
  determining that a surface area of the component is less than the threshold area.

11. The method of claim 9, further comprising:
  setting the threshold distance as a share of a linear size of the 3D polygonal mesh.

12. The method of claim 9, further comprising:
  determining that the intersection point is located on a back surface of the 3D polygonal mesh; and
  identifying the surface as the back surface.

13. The method of claim 9, wherein the component forms a structure enclosing a defined volume.

14. The method of claim 9, wherein generating the simplified component further comprises:
  responsive to determining that removing the surface from the component introduces a non-manifold topology to the simplified component, wherein the non-manifold topology comprises a first vertex of a first component that is incident to two or more locally disconnected surfaces of the first component, retaining the surface as part of the simplified component.

15. A non-transitory computer readable storage medium, having instructions stored therein, which when executed by a processing device, cause the processing device to:
  identify a component of a three-dimensional (3D) polygonal mesh, wherein the component comprises a set of topologically interconnected surfaces;
  cast a ray from a surface of the component in a direction of a surface normal vector of the surface;
  identify an intersection point of the ray with the 3D polygonal mesh, wherein the intersection point is closest, among two or more intersection points of the ray with the 3D polygonal mesh, to a start of the ray; and
  responsive to determining that a distance between the surface and the intersection point is less than a threshold distance, removing the surface from the component to produce a simplified component.

16. The non-transitory computer readable storage medium of claim 15, further comprising executable instructions to cause the processing device to:
  setting a threshold surface area as a share of the total surface area of the 3D polygonal mesh; and
  determining that a surface area of the component is less than the threshold area.

17. The non-transitory computer readable storage medium of claim 15, further comprising executable instructions to cause the processing device to:
  setting the threshold distance as a share of a linear size of the 3D polygonal mesh.

18. The non-transitory computer readable storage medium of claim 15, further comprising executable instructions to cause the processing device to:
  determining that the intersection point is located on a back surface of the 3D polygonal mesh; and
  identifying the first surface as the back surface.

19. The non-transitory computer readable storage medium of claim 15, wherein the component forms a structure enclosing a defined volume.

20. The non-transitory computer readable storage medium of claim 15, wherein generating the simplified component further comprises:
  responsive to determining that removing the surface from the component introduces a non-manifold topology to the simplified component, wherein the non-manifold topology comprises a first vertex of a first component that is incident to two or more locally disconnected surfaces of the first component, retaining the surface as part of the simplified component.

* * * * *